(12) United States Patent
Gou et al.

(10) Patent No.: US 11,329,776 B2
(45) Date of Patent: May 10, 2022

(54) DATA TRANSMISSION METHOD AND APPARATUS

(71) Applicant: ZTE Corporation, Guangdong (CN)

(72) Inventors: Wei Gou, Guangdong (CN); Feng Bi, Guangdong (CN); Peng Hao, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/261,525

(22) Filed: Jan. 29, 2019

(65) Prior Publication Data
US 2019/0349160 A1 Nov. 14, 2019

Related U.S. Application Data

(63) Continuation of application No. PCT/CN2017/095276, filed on Jul. 31, 2017.

(30) Foreign Application Priority Data

Jul. 29, 2016 (CN) .......................... 201610616007.5

(51) Int. Cl.
*H04L 5/00* (2006.01)
*H04W 76/27* (2018.01)
*H04W 72/04* (2009.01)

(52) U.S. Cl.
CPC .......... *H04L 5/0048* (2013.01); *H04L 5/0007* (2013.01); *H04W 72/0446* (2013.01); *H04W 76/27* (2018.02)

(58) Field of Classification Search
CPC ............. H04W 72/1284; H04W 72/10; H04W 72/1289; H04W 72/1242; H04W 72/1205;
(Continued)

(56) References Cited

U.S. PATENT DOCUMENTS

2013/0163532 A1* 6/2013 Anderson ......... H04W 72/1278
370/329
2013/0301582 A1* 11/2013 Jiang ................... H04W 72/042
370/329
(Continued)

FOREIGN PATENT DOCUMENTS

CN 101835262 A 9/2010
CN 101925107 A 12/2010
(Continued)

OTHER PUBLICATIONS

3 GPP, "Technical Specification Group Radio Access Network; Evolved Universal Terrestrial Radio Access (E-UTRA)", 3GPP TR 36.881 v14.0.0, France, 99 pages, Jun. 2016.
(Continued)

*Primary Examiner* — Steven H Nguyen
(74) *Attorney, Agent, or Firm* — Perkins Coie LLP

(57) ABSTRACT

Embodiments of the present disclosure provide a data transmission method and apparatus. The method includes: transmitting, by a transmitting node, configuration information of a pre-scheduling period, where the configuration information of the pre-scheduling period is used for instructing a receiving node to prepare data to be transmitted according to the configuration information of the pre-scheduling period; and receiving, by the transmitting node, the data to be transmitted which is transmitted from the receiving node. The embodiments of the present disclosure may solve the problem in the existing art of a large feedback time interval after data transmission and achieve effects of shortening a data transmission time interval and improving data transmission efficiency.

13 Claims, 5 Drawing Sheets

Transmit, by a transmitting node, configuration information of a pre-scheduling period, where the configuration information of the pre-scheduling period is used for instructing a receiving node to prepare data to be transmitted according to the configuration information of the pre-scheduling period —S202

Receive, by the transmitting node, the data to be transmitted which is transmitted from the receiving node —S204

(58) Field of Classification Search
CPC ... H04L 5/0053; H04L 5/0044; H04L 5/0094; H04L 5/0091; H04L 1/00; H04L 5/0064; H04L 1/0023; H04L 1/0039
See application file for complete search history.

(56) References Cited

U.S. PATENT DOCUMENTS

| | | | |
|---|---|---|---|
| 2015/0237649 A1* | 8/2015 | Zhang | H04W 4/70 370/329 |
| 2015/0289268 A1* | 10/2015 | Ohta | H04W 4/70 370/336 |
| 2016/0242176 A1* | 8/2016 | Sun | H04W 76/27 |
| 2016/0262178 A1* | 9/2016 | Vangala | H04W 72/14 |
| 2017/0127433 A1* | 5/2017 | Lin | H04W 74/0816 |
| 2018/0146502 A1* | 5/2018 | Tomeba | H04W 72/1273 |
| 2018/0237649 A1 | 8/2018 | Pan et al. | |
| 2019/0098544 A1* | 3/2019 | Han | H04W 36/30 |

FOREIGN PATENT DOCUMENTS

| | | |
|---|---|---|
| CN | 102325377 A | 1/2012 |
| CN | 105764146 A | 7/2016 |
| EP | 2 635 082 A1 | 9/2013 |
| WO | 2015/047145 A1 | 4/2015 |

OTHER PUBLICATIONS

Alcatel-Lucent Shanghai Bell, "Discussion on solutions for latency reduction", 3GPP TSG-RAN WG2 Meeting #91, Beijing, China, R2-153702, 3 pages, Aug. 2015.

Chinese Office Action dated Apr. 9, 2020 for Chinese Patent Application No. 201610616007.5, filed on Jul. 29, 2016 (18 pages).

Chinese Office Action dated Jan. 19, 2020 for Chinese Patent Application No. 201610616007.5, filed on Jul. 29, 2016 (18 pages).

Extended Search Report dated May 26, 2020 for European Application No. 17833607.9, filed on Feb. 27, 2019 (12 pages).

International Search Report and Written Opinion dated Oct. 11, 2017 for International Application No. PCT/CN2017/095276, filed on Jul. 31, 2017 (14 pages).

Chinese Office Action dated Jul. 1, 2020 for Chinese Patent Application No. 201610616007.5, filed on Jul. 29, 2016 (24 pages).

* cited by examiner

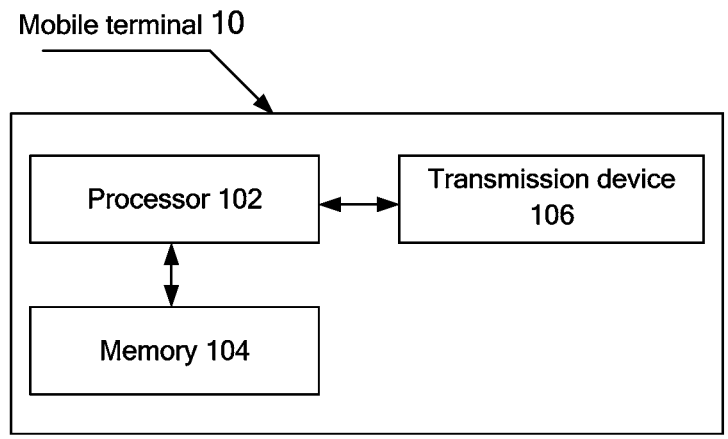

FIG. 1

Transmit, by a transmitting node, configuration information of a pre-scheduling period, where the configuration information of the pre-scheduling period is used for instructing a receiving node to prepare data to be transmitted according to the configuration information of the pre-scheduling period — S202

Receive, by the transmitting node, the data to be transmitted which is transmitted from the receiving node — S204

FIG. 2

DATA TRANSMISSION METHOD AND APPARATUS

CROSS REFERENCE TO RELATED APPLICATIONS

This patent document is a continuation of and claims the benefit of priority to International Patent Application No. PCT/CN2017/095276, filed on Jul. 31, 2017, which claims the benefit of priority of Chinese Patent Application No. 201610616007.5, filed on Jul. 29, 2016. The entire contents of the before-mentioned patent applications are incorporated by reference as part of the disclosure of this application.

TECHNICAL FIELD

The present disclosure relates to the field of communications and, in particular, to a data transmission method and apparatus.

BACKGROUND

With continuous advance in radio technologies, various radio services are flourishing. However, frequency spectrum resources on which the radio services are based are limited. As bandwidth requirements are increasing, the frequency spectrum resources of 300 MHz to 3 GHz mainly used in the traditional commercial communications are extremely strained and cannot meet requirements of the future wireless communications.

In a new generation mobile communication system, new radio (NR), system networking will be implemented at a carrier frequency higher than a carrier frequency used in 2G, 3G and 4G systems. Currently, frequency bands widely recognized by the industry and international organizations are mainly 3 GHz to 6 GHz and 6 GHz to 100 GHz. These frequency bands basically belong to a centimeter waveband and a millimeter waveband. Studies show that phase noise of a radio frequency (RF) device is quite severe at a frequency between 6 GHz and 100 GHz, especially at a higher frequency, and the phase noise may be resisted by increasing a subcarrier width of an orthogonal frequency division multiple access system. A high frequency band significantly differs from a lower frequency band in terms of propagation characteristics. Since propagation losses in the high frequency band are significantly larger than propagation losses in the low frequency band, the coverage of the high frequency band is generally much smaller than the coverage of the low frequency band. The smaller coverage generally goes with smaller channel delay spread, and the corresponding coherence bandwidth is larger than a coherent bandwidth in the low frequency band of 300 M to 3000 M. An increased subcarrier width with respect to a subcarrier width in the Long-Term Evolution (LTE) system may still satisfy a design requirement that subcarrier spacing is within the coherent bandwidth. Therefore, the subcarrier spacing (equivalent to the subcarrier width) needs to be adjusted according to high/low-frequency carriers with present and reasonable feasibility.

The NR system covers the carrier frequencies from 6 GHz up to 100 GHz. Different basic parameters of a frame structure such as subcarrier spacings need to be used to adapt to the carrier frequencies, that is, design parameters of the frame structure are different at each carrier frequency. For example, the closer a frequency is to a core frequency of the LTE, the closer typical parameters of the frame structure such as subcarrier spacings are to the existing parameters of the LTE; the higher the frequency, the larger the subcarrier spacing. The subcarrier spacing studied currently may be from 15 kHz, 30 kHz, 60 kHz, 75 kHz, 120 kHz up to 240 kHz, or less than 15 kHz.

The NR system not only has different parameters of the frame structure at different frequencies, but also has different subcarrier spacing parameters according to different types of transmission services on the same carrier. For example, a service of the ultra-reliable and low latency communications (URLLC) emphasizes a low latency and has shorter symbols and larger subcarrier spacings than the enhance mobile broadband (eMBB) applications; and a service of the massive machine type communication (mMTC) has requirements towards massive accesses and deep coverage and may have far smaller subcarrier spacings and much larger symbol lengths than the eMBB. Multiple types of services are multiplexed on the same carrier, resulting in more complicated parameters of the frame structure in the system.

Another obvious feature of the NR system in the 5G is a self-containment mechanism. An interval 1 means that after downlink data is transmitted, acknowledgement/non-acknowledgement (ACK/NACK) information corresponding to a user equipment (UE) needs to be received in the same scheduling unit (or in a short interval). An interval 2 means that corresponding uplink data is transmitted in many intervals after uplink grant information is transmitted. For example, a feedback intervals in the above two cases are both 4 ms in the LTE. In the NR system, the interval needs to be greatly compressed to, for example, a maximum of several hundred microseconds. In particular, the URLLC service requires smaller intervals of, for example, up to tens of microseconds.

No effective solution has yet been proposed for the above requirements in the existing art.

SUMMARY

Embodiments of the present disclosure provide a data transmission method and apparatus to solve at least the problem in the existing art of a large feedback time interval after data transmission.

An embodiment of the present disclosure provides a data transmission method. The method includes the following steps: a transmitting node transmits configuration information of a pre-scheduling period, where the configuration information of the pre-scheduling period is used for instructing a receiving node to prepare data to be transmitted according to the configuration information of the pre-scheduling period; and the transmitting node receives the data to be transmitted which is transmitted from the receiving node.

Optionally, the configuration information of the pre-scheduling period is determined in the following manner: the transmitting node configures the configuration information of the pre-scheduling period; or the transmitting node and the receiving node assume on the configuration information of the pre-scheduling period.

Optionally, a position at which the transmitting node transmits the configuration information of the pre-scheduling period is determined in one of the following manners: the transmitting node determines a pre-scheduling period timing pre-configured or assumed by the transmitting node and the receiving node and transmits the configuration information of the pre-scheduling period to the receiving node at the pre-scheduling period timing; the transmitting node determines a scheduling triggering timing for transmitting the configuration information of the pre-scheduling period and transmits the configuration information of the pre-scheduling period to the receiving node at the scheduling triggering timing; and the transmitting node determines a transmitting position pre-configured or assumed by the transmitting node and the receiving node and transmits the configuration information of the pre-scheduling period at the transmitting position. The pre-scheduling period includes at least one scheduling triggering timing.

Optionally, a position of the pre-scheduling period timing for transmitting the configuration information of a current pre-scheduling period includes one of: a starting point of the current pre-scheduling period, an ending point of a previous pre-scheduling period, an assumed point in the previous pre-scheduling period, a point configured via predetermined signaling in the previous pre-scheduling period and a scheduling triggering timing configured or assumed via the predetermined signaling in the previous pre-scheduling period.

Optionally, the transmitting node receives the data to be transmitted which is transmitted from the receiving node through the following step: the transmitting node transmits scheduling triggering information, used for triggering the receiving node to transmit the data to be transmitted, to the receiving node and receives the data to be transmitted which is transmitted from the receiving node; or the transmitting node receives the data to be transmitted which is transmitted in an assumed manner by the receiving node at a scheduling triggering timing. The scheduling triggering information is used for scheduling or triggering transmission of uplink service data.

Optionally, the transmitting node transmits the scheduling triggering information to the receiving node through the following step: the transmitting node determines the scheduling triggering timing and transmits the scheduling triggering information to the receiving node at the determined scheduling triggering timing; or the transmitting node transmits the scheduling triggering information to the receiving node at a pre-scheduling period timing pre-configured or assumed by the transmitting node and the receiving node.

Optionally, the scheduling triggering timing includes at least one of: a scheduling triggering timing configured by the transmitting node, a scheduling triggering timing assumed by the transmitting node with the receiving node, a scheduling triggering timing dynamically acquired according to service transmission requirements and a scheduling triggering timing configured through the configuration information of the pre-scheduling period.

Optionally, the transmitting node transmits the configuration information of the pre-scheduling period through the following step: the transmitting node transmits the configuration information in at least one of the following manners: the transmitting node transmits the configuration information through a higher-layer system broadcast message; the transmitting node transmits the configuration information through a dedicated radio resource control (RRC) message of the receiving node; the transmitting node transmits the configuration information through a dedicated downlink or uplink physical control channel of the receiving node; and the transmitting node transmits the configuration information through a common downlink or uplink physical control channel.

Optionally, the method further includes the following step: the transmitting node configures a size and/or a starting point of the pre-scheduling period through dynamic and/or semi-static configuration information in at least one of the following manners: the transmitting node configures the size of the pre-scheduling period through the semi-static configuration information and the transmitting node configures a period-related starting point of the pre-scheduling period through the dynamic configuration information; the transmitting node configures the size and the starting point of the pre-scheduling period through the semi-static configuration information; and the transmitting node configures the size and/or the starting point of the pre-scheduling period through the semi-static configuration information and takes the configured size and/or starting point of the pre-scheduling period as a scheduling transmission criterion for data transmission, and the transmitting node is allowed to reconfigure the size and/or the starting point of the pre-scheduling period through the dynamic configuration information as the scheduling transmission criterion for data transmission.

Optionally, the method further includes the following step: the transmitting node and the receiving node assume on a size and/or a starting point of the pre-scheduling period.

Optionally, after the transmitting node and the receiving node assume on the size and/or the starting point of the pre-scheduling period, the method further includes the following steps: the transmitting node takes the size and/or the starting point of the pre-scheduling period assumed by the transmitting node and the receiving node as a scheduling transmission criterion for data transmission and the transmitting node is allowed to reconfigure the size and/or the starting point of the pre-scheduling period through dynamic configuration information as the scheduling transmission criterion for data transmission.

Optionally, a size of the pre-scheduling period is an absolute time amount or a relative time amount. When the size of the pre-scheduling period is the absolute time amount, the pre-scheduling period is an absolute duration. When the size of the pre-scheduling period is the relative time amount, the size of the pre-scheduling period is determined according to at least one of the following determined information: a number of orthogonal frequency division multiplexing (OFDM) symbols, a number of scheduling units, a number of subframes, a number of timeslots and a number of scheduling triggering timings.

Optionally, when the size of the pre-scheduling period is determined according to at least one of the determined information, at least one pre-scheduling period includes at least one of: the OFDM symbols of different durations, the scheduling units of different durations, the subframes of different durations and timeslots of different durations; and/or only one pre-scheduling period includes at least one of: the OFDM symbols of a same duration, the scheduling units of a relative duration, the subframes of the same duration and timeslots of the same duration.

Optionally, a level of the configuration information of the pre-scheduling period includes at least one of: a cell level, a beam level, a level of a receiving node, a carrier level, a service type level, a level of a group of receiving nodes, a beam group level, a cell group level, a carrier group level and a level of a group of service types. The level of the receiving node refers to that each receiving node corresponds to one size and/or one starting point of the pre-scheduling period and has corresponding configuration information of the pre-scheduling period and scheduling triggering timings.

Optionally, when the configuration information of the pre-scheduling period is at the level of the receiving node, the size and/or the starting point of the pre-scheduling period configured through the configuration information is directed to the receiving node and the pre-scheduling period includes at least one scheduling triggering timing; the transmitting node transmits scheduling triggering information at the at least one scheduling triggering timing and the receiving node transmits data after the receiving node detects the scheduling triggering information. Alternatively, when the configuration information of the pre-scheduling period is at the level of the receiving node, the size and/or the starting point of the pre-scheduling period configured through the configuration information is directed to the receiving node and the pre-scheduling period includes the at least one scheduling triggering timing; the receiving node directly transmits the data at the at least one scheduling triggering timing. The configuration in this case includes resource allocation information and/or modulation and coding information.

Optionally, the configuration information of the pre-scheduling period includes at least one of: a size and/or a starting point of the pre-scheduling period, coding-related information within the pre-scheduling period during data transmission and a position of a scheduling triggering timing. The coding-related information includes at least one of: at least one piece of modulation and coding information, at least one beamforming parameter, at least one piece of transport block size information, a parameter for instructing to transmit, in a current pre-scheduling period, the configuration information of the pre-scheduling period of a next pre-scheduling period and resource allocation information.

Optionally, the scheduling triggering information includes at least one of: resource allocation information, transmitting triggering information, a specific time or scheduling unit for transmitting the data to be transmitted, an identifier of the receiving node and indication information for indicating the data to be transmitted. The indication information for indicating the data to be transmitted is used for notifying the receiving node to select current data to be transmitted from more than two pieces of data to be transmitted prepared according to the configuration information of the pre-scheduling period. The transmitting triggering information is used for notifying the receiving node to transmit the prepared data to be transmitted at a specific transmitting time which is a pre-assumed scheduling unit after the transmitting triggering information has been received.

Another embodiment of the present disclosure provides a data transmission method. The method includes the following steps: a receiving node receives configuration information of a pre-scheduling period from a transmitting node; the receiving node prepares data to be transmitted according to the configuration information of the pre-scheduling period; and the receiving node transmits the data to be transmitted.

Optionally, the receiving node transmits the data to be transmitted through one of the following steps: the receiving node receives scheduling triggering information from the transmitting node, and transmits the data to be transmitted according to the scheduling triggering information; the receiving node transmits the data to be transmitted in an assumed manner with the transmitting node at a scheduling triggering timing; and the receiving node transmits the data to be transmitted at the scheduling triggering timing at a position of the pre-scheduling period according to the configuration information of the pre-scheduling period. The pre-scheduling period includes at least one scheduling triggering timing.

Optionally, the receiving node receives the scheduling triggering information from the transmitting node through the following steps: the receiving node determines the scheduling triggering timing; and the receiving node receives the scheduling triggering information at the scheduling triggering timing.

Optionally, the receiving node determines the scheduling triggering timing in at least one of the following manners: the receiving node determines a scheduling triggering timing configured by the transmitting node, determines a scheduling triggering timing assumed by the transmitting node with the receiving node, determines a scheduling triggering timing dynamically acquired according to service transmission requirements, determines a scheduling triggering timing configured through the configuration information of the pre-scheduling period, and determines the scheduling triggering timing according to a size and/or a starting point of the pre-scheduling period. The scheduling triggering timing is determined according to the size and/or the starting point of the pre-scheduling period when the pre-scheduling period includes one scheduling triggering timing.

Optionally, the receiving node transmits the data to be transmitted according to the scheduling triggering information in the following manner: the receiving node transmits the data to be transmitted in an assumed manner with the transmitting node at a predetermined time after the scheduling triggering information has been received.

Optionally, the receiving node receives the configuration information of the pre-scheduling period from the transmitting node through the following step: the receiving node determines a pre-scheduling period timing pre-configured by the transmitting node or assumed with the transmitting node and receives the configuration information of the pre-scheduling period from the transmitting node at the pre-scheduling period timing; or the receiving node determines a scheduling triggering timing of receiving the configuration information of the pre-scheduling period and receives the configuration information of the pre-scheduling period from the transmitting node at the scheduling triggering timing; or by the receiving node determines a transmitting position pre-configured by the transmitting node or assumed with the transmitting node and receives the configuration information of the pre-scheduling period from the transmitting node at the transmitting position.

Optionally, a position of the pre-scheduling period timing for transmitting the configuration information of a current pre-scheduling period includes one of: a starting point of the current pre-scheduling period, an ending point of a previous pre-scheduling period, an assumed point in the previous pre-scheduling period, a point configured via predetermined signaling in the previous pre-scheduling period and a scheduling triggering timing configured or assumed via the predetermined signaling in the previous pre-scheduling period.

Optionally, a level of the predetermined signaling includes at least one of: a cell level, a beam level, a level of a transmitting node, a carrier level, a service type level, a level of a group of transmitting nodes, a beam group level, a cell group level, a carrier group level and a level of a group of service types.

Optionally, the receiving node receives the configuration information of the pre-scheduling period from the transmitting node in at least one of the following manners: the receiving node receives the configuration information transmitted from the transmitting node through a higher-layer system broadcast message; the receiving node receives the configuration information transmitted from the transmitting node through a dedicated radio resource control (RRC) message of the receiving node; the receiving node receives the configuration information transmitted from the transmitting node through a dedicated downlink or uplink physical control channel of the receiving node; and the receiving node receives the configuration information transmitted from the transmitting node through a common downlink or uplink physical control channel.

Optionally, the configuration information of the pre-scheduling period includes at least one of: a size and/or a starting point of the pre-scheduling period, coding-related information within the pre-scheduling period during data transmission and a position of a scheduling triggering timing. The coding-related information includes at least one of: at least one piece of modulation and coding information, at least one beamforming parameter, at least one piece of transport block size information, a parameter for instructing to transmit, in a current pre-scheduling period, the configuration information of the pre-scheduling period of a next pre-scheduling period and resource allocation information.

Optionally, when the coding-related information includes the transport block size information of a plurality of transport block sizes, the receiving node needs to separately prepare the data to be transmitted according to the plurality of transport block sizes, which includes separately performing an inter-layer packaging process. When the coding-related information includes a plurality of pieces of transport block size information with respective corresponding modulation and coding information, the receiving node needs to separately prepare the data to be transmitted according to the plurality of pieces of transport block size information with the respective corresponding modulation and coding information, which includes separately performing the inter-layer packaging process and a modulation and coding process. When the coding-related information includes the plurality of pieces of transport block size information and a plurality of pieces of modulation and coding information, the receiving node needs to separately prepare the data to be transmitted according to a combination of the plurality of pieces of transport block size information and the plurality of pieces of modulation and coding information, which includes separately performing the inter-layer packaging process, the modulation and coding process and a beamforming process. When the coding-related information includes the plurality of pieces of transport block size information, the plurality of pieces of modulation and coding information and a plurality of beamforming parameters, the receiving node needs to separately prepare the data to be transmitted according to a combination of values of the plurality of pieces of transport block size information, the plurality of pieces of modulation and coding information and the plurality of beamforming parameters, which includes separately performing the inter-layer packaging process, the modulation and coding process and the beamforming process.

Optionally, the size and/or the starting point of the pre-scheduling period is configured via dynamic configuration signaling and/or semi-static configuration signaling in one of the following manners: the receiving node receives and determines the size of the pre-scheduling period via the semi-static configuration signaling and the receiving node receives and determines a period-related starting point of the pre-scheduling period via the dynamic configuration signaling; the receiving node receives and determines the size and the starting point of the pre-scheduling period via the semi-static configuration signaling; and the receiving node determines the size and/or the starting point of the pre-scheduling period via the semi-static configuration signaling and takes the configured size and/or starting point of the pre-scheduling period as a scheduling transmission criterion for data transmission, and the receiving node is allowed to reconfigure the size and/or the starting point of the pre-scheduling period taken as the scheduling transmission criterion for data transmission through dynamic configuration information.

Optionally, the scheduling triggering information includes at least one of: resource allocation information, transmitting triggering information, a specific time or scheduling unit for transmitting the data to be transmitted, an identifier of the receiving node and indication information for indicating the data to be transmitted. The indication information for indicating the data to be transmitted is used for notifying the receiving node to select current data to be transmitted from more than two pieces of data to be transmitted prepared according to the configuration information of the pre-scheduling period. The transmitting triggering information is used for notifying the receiving node to transmit the prepared data to be transmitted at a specific transmitting time which is a pre-assumed scheduling unit after the transmitting triggering information has been received.

Optionally, a level of the configuration information of the pre-scheduling period includes at least one of: a cell level, a beam level, a level of a receiving node, a carrier level, a service type level, a level of a group of receiving nodes, a beam group level, a cell group level, a carrier group level and a level of a group of service types. The level of the receiving node refers to that each receiving node corresponds to one size and/or one starting point of the pre-scheduling period and has corresponding configuration information of the pre-scheduling period and scheduling triggering timings.

Optionally, when the configuration information of the pre-scheduling period is at the level of the receiving node, the size and/or the starting point of the pre-scheduling period configured through the configuration information is directed to the receiving node and the pre-scheduling period includes at least one scheduling triggering timing; the transmitting node transmits scheduling triggering information at the at least one scheduling triggering timing and the receiving node transmits data after the receiving node detects the scheduling triggering information. Alternatively, when the configuration information of the pre-scheduling period is at the level of the receiving node, the size and/or the starting point of the pre-scheduling period configured through the configuration information is directed to the receiving node and the pre-scheduling period includes the at least one scheduling triggering timing; the receiving node directly transmits data at the at least one scheduling triggering timing. The configuration in this case includes resource allocation information and/or modulation and coding information.

An embodiment of the present disclosure provides a data transmission apparatus, applied to a transmitting node. The apparatus includes a first transmitting module and a first receiving module. The first transmitting module is configured to transmit configuration information of a pre-scheduling period, where the configuration information of the pre-scheduling period is used for instructing a receiving node to prepare data to be transmitted according to the configuration information of the pre-scheduling period. The first receiving module is configured to receive the data to be transmitted which is transmitted from the receiving node.

An embodiment of the present disclosure provides a data transmission apparatus, applied to a receiving node. The apparatus includes a second receiving module, a preparation module, and a second transmitting module. The second receiving module is configured to receive configuration information of a pre-scheduling period from a transmitting node. The preparation module is configured to prepare data to be transmitted according to the configuration information of the pre-scheduling period. The second transmitting module is configured to transmit the data to be transmitted.

Another embodiment of the present disclosure provides a storage medium. The storage medium includes stored programs which, when executed, execute the method of any one of the embodiments described above.

In the above steps, the transmitting node transmits the configuration information of the pre-scheduling period to the receiving node and the receiving node can prepare the data to be transmitted in advance according to the configuration information of the pre-scheduling period; then the transmitting node may transmit the scheduling triggering information to instruct the receiving node to immediately transmit the data to be transmitted, or the transmitting node may receive the data to be transmitted which is transmitted from the receiving node in an assumed manner, thereby shortening a time interval between the scheduling triggering information and the data to be transmitted. Apparently, the method is also favorable to reduce signaling overheads, for example, overheads of the scheduling triggering information may be much less than the existing overheads of uplink authorization information in the LTE. Therefore, the present disclosure may solve the problem in the existing art of a large feedback time interval after data transmission and achieve effects of shortening a data transmission time interval and improving data transmission efficiency.

BRIEF DESCRIPTION OF DRAWINGS

The drawings described herein are used to provide a further understanding of the present disclosure and form a part of the present application. The exemplary embodiments and descriptions thereof in the present disclosure are used to explain the present disclosure and not to limit the present disclosure in any improper way. In the drawings:

FIG. 1 is a block diagram illustrating a hardware structure of a mobile terminal according to an embodiment of the present disclosure;

FIG. 2 is method flowchart 1 according to an embodiment of the present disclosure;

DETAILED DESCRIPTION

Figure 3:
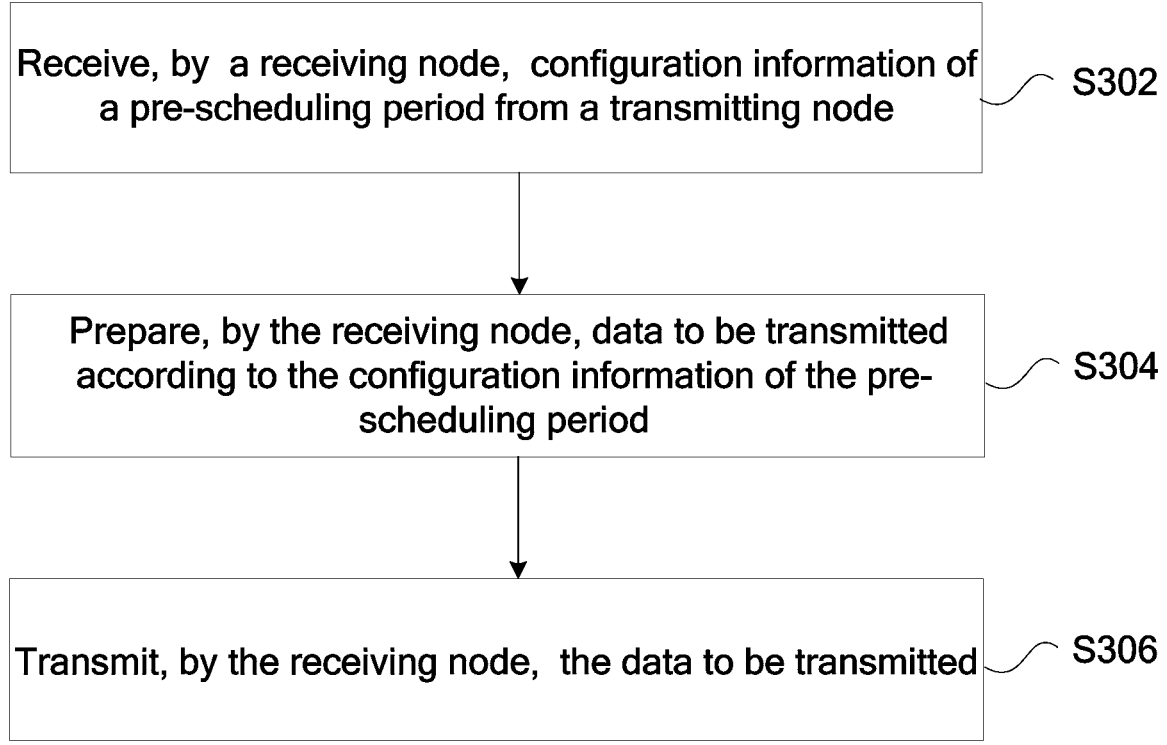
FIG. 3 is method flowchart 2 according to an embodiment of the present disclosure.

Hereinafter the present disclosure will be described in detail with reference to the drawings in conjunction with the embodiments. It is to be noted that if not in collision, the embodiments and features therein in the present application may be combined with each other.

It is to be noted that the terms "first", "second" and the like in the description, claims and drawings of the present disclosure are used to distinguish between similar objects and are not necessarily used to describe a particular order or sequence.

A method embodiment provided by the embodiments of the present application may be executed in a base station, a mobile terminal, a computer terminal or other similar computing apparatuses. Taking the method to be executed in the mobile terminal as an example, FIG. 1 is a block diagram illustrating a hardware structure of a mobile terminal for a data transmission method according to an embodiment of the present disclosure. As shown in FIG. 1, a mobile terminal 10 may include one or more (only one is shown in FIG. 1) processors 102 (the processor 102 may include, but is not limited to, a processing device such as a microprocessor MCU or a programmable logic device FPGA), a memory 104 configured to store data, and a transmission device 106 configured to implement a communication function. It should be understood by those skilled in the art that the structure shown in FIG. 1 is merely illustrative and not intended to limit the structure of the electronic apparatus described above. For example, the mobile terminal 10 may further include more or fewer components than the components shown in FIG. 1 or may have a configuration different from the configuration shown in FIG. 1.

The memory 104 may be configured to store software programs and modules of application software, such as program instructions/modules corresponding to the data transmission method in the embodiments of the present disclosure. The processors 102 is configured to execute the software programs and modules stored in the memory 104 to perform functional applications and data processing, that is, to implement the method described above. The memory 104 may include a high-speed random access memory, and may further include a nonvolatile memory, such as one or more magnetic storage apparatuses, flash memories or other non-volatile solid-state memories. In some examples, the memory 104 may further include memories that are remotely disposed with respect to the processor 102. These remote memories may be connected to the mobile terminal 10 via a network. Examples of the network described above include, but are not limited to, the Internet, an intranet, a local area network, a mobile communication network and a combination thereof.

The transmission device 106 is configured to receive or transmit data via a network. Specific examples of such a network may include a wireless network provided by a communication provider of the mobile terminal 10. In one example, the transmission device 106 includes a network interface controller (NIC), which may be connected to other network devices via a base station, thereby communicating with the Internet. In one example, the transmission device 106 may be a Radio Frequency (RF) module, which is configured to communicate with the Internet in a wireless way.

The embodiment provides a data transmission method. FIG. 2 is method flowchart 1 according to an embodiment of the present disclosure. As shown in FIG. 2, the method includes steps described below.

In step S202, a transmitting node transmits configuration information of a pre-scheduling period (which may also be referred to as a scheduling repetition period), where the configuration information of the pre-scheduling period is used for instructing a receiving node to prepare to data to be transmitted according to the configuration information of the pre-scheduling period.

In step S204, the transmitting node receives the data to be transmitted which is transmitted from the receiving node.

In the above steps, the transmitting node transmits the configuration information of the pre-scheduling period to the receiving node and the receiving node can prepare the data to be transmitted in advance according to the configuration information of the pre-scheduling period. Next, the transmitting node may transmit scheduling triggering information to instruct the receiving node to immediately transmit the data to be transmitted. Alternatively, the transmitting node may receive the data to be transmitted, which is transmitted from the receiving node, in an assumed manner, thereby shortening a time interval between transmitting the scheduling triggering information and the data to be transmitted. Apparently, the method is also favorable to reduce signaling overheads. For example, overheads of the scheduling triggering information may be much less than the overheads of uplink authorization information in the existing LTE. Therefore, the present disclosure may solve the problem in the existing art of a large feedback time interval after data transmission and achieve effects of shortening a data transmission time interval and improving data transmission efficiency.

Optionally, the above steps may, but may not necessarily, be executed by a base station.

In an optional embodiment, the configuration information of the pre-scheduling period is determined in the following manner: the transmitting node sets the configuration information of the pre-scheduling period; or the transmitting node and the receiving node assume on the configuration information of the pre-scheduling period.

In an optional embodiment, the transmitting node transmits the configuration information of the pre-scheduling period in one of the manners described below. The transmitting node determines a pre-scheduling period timing preset or assumed with the receiving node and transmits the configuration information of the pre-scheduling period which is pre-divided to the receiving node at the determined pre-scheduling period timing. The transmitting node determines a scheduling triggering timing for transmitting the configuration information of the pre-scheduling period and transmits the configuration information of the pre-scheduling period to the receiving node at the scheduling triggering timing. The transmitting node determines a transmitting position preset or assumed with the receiving node and transmits the configuration information of the pre-scheduling period at the transmitting position. One pre-scheduling period includes at least one scheduling triggering timing. In this embodiment, the transmitting node (such as the base station) divides time domain into a plurality of pre-scheduling periods and transmits the configuration information of the pre-scheduling period at the time of the pre-scheduling period. Uplink data transmission and/or downlink data transmission are allowed in the pre-scheduling period.

In an optional embodiment, a position of the pre-scheduling period timing for transmitting the configuration information of a current pre-scheduling period includes one of: a starting point of the current pre-scheduling period, an ending point of a previous pre-scheduling period, an assumed point in the previous pre-scheduling period, a point configured via predetermined signaling in the previous pre-scheduling period and a scheduling triggering timing configured or assumed via the predetermined signaling in the previous pre-scheduling period. In this embodiment, the transmitting node configures the transmitting position at which the configuration information of the pre-scheduling period is transmitted, or the transmitting node and the receiving node assume in advance on the transmitting position at which the configuration information of the pre-scheduling period is transmitted. The configuration information of the current pre-scheduling period is transmitted at an assumed point in the previous pre-scheduling period or the position configured via the predetermined signaling in the previous pre-scheduling period, a time interval between the position and the starting point of the current pre-scheduling period is determined by modulation and coding time and the like. The predetermined signaling is transmitted in the configuration information of the pre-scheduling period.

In an optional embodiment, the transmitting node receives the data to be transmitted which is transmitted from the receiving node through the following steps: the transmitting node transmits the scheduling triggering information, used for triggering the receiving node to transmit the data to be transmitted, to the receiving node and receives the data to be transmitted which is transmitted from the receiving node; or the transmitting node receives the data to be transmitted which is transmitted in the assumed manner by the receiving node at the scheduling triggering timing. In this embodiment, the scheduling triggering information is used for scheduling or triggering transmission of uplink service data. The transmitting node (such as the base station) configures a plurality of scheduling triggering timings in the pre-scheduling period and transmits the scheduling triggering information at the plurality of scheduling triggering timings, that is, the scheduling trigger timing is a position in the pre-scheduling period where the scheduling triggering information is allowed to be transmitted. The scheduling triggering information is used for scheduling or triggering the transmission of the uplink service data, that is, the data to be transmitted is transmitted at a position where the scheduling triggering information is allowed to be received. Alternatively, the transmitting node does not transmit the scheduling triggering information, but the data to be transmitted is transmitted at the scheduling triggering timing pre-assumed by the transmitting node and the receiving node, that is, uplink data is allowed to be directly transmitted at the scheduling triggering timing.

In an optional embodiment, the transmitting node transmits the scheduling triggering information to the receiving node through the following step: the transmitting node determines the scheduling triggering timing and transmits the scheduling triggering information to the receiving node at the determined scheduling triggering timing; or the transmitting node transmits the scheduling triggering information to the receiving node at the pre-scheduling period timing preset or assumed with the receiving node. In this embodiment, the configuration information of the pre-scheduling period may be transmitted at the pre-scheduling period timing, and the scheduling triggering information may also be transmitted at the pre-scheduling period timing.

In an optional embodiment, the scheduling triggering timing includes at least one of: a scheduling triggering timing configured by the transmitting node, a scheduling triggering timing assumed by the transmitting node with the receiving node, a scheduling triggering timing dynamically acquired according to service transmission requirements and a scheduling triggering timing configured through the configuration information of the pre-scheduling period. In this embodiment, the configured scheduling triggering information or the assumed scheduling triggering information may be periodic or aperiodic; the scheduling triggering timing dynamically acquired or configured through the configuration information of the pre-scheduling period may be immediately dynamically acquired according to the service transmission requirements, that is, the scheduling triggering timing is temporarily configured according to different service transmission requirements.

In an optional embodiment, the transmitting node transmits the configuration information of the pre-scheduling period through the following step: the transmitting node transmits the configuration information of the pre-scheduling period to the receiving node via configuration signaling. In this embodiment, the configuration information of the pre-scheduling period is valid in the whole pre-scheduling period.

In an optional embodiment, the configuration information may be transmitted in at least one of the following manners: the configuration information is transmitted through a higher-layer system broadcast message; the configuration information is transmitted through a dedicated radio resource control (RRC) message of the receiving node; the configuration information is transmitted through a dedicated downlink or uplink physical control channel of the receiving node; and the configuration information is transmitted through a common downlink or uplink physical control channel.

In an optional embodiment, the method further includes the following step: the transmitting node configures a size and/or a starting point of the pre-scheduling period through dynamic and/or semi-static configuration information (which may be also referred to as the configuration signaling). In this embodiment, the size and/or the starting point of the repetition period may be modified through the dynamic and/or semi-static configuration information.

In an optional embodiment, the size and/or the starting point of the pre-scheduling period are configured through dynamic and/or semi-static configuration information in at least one of the manners described below. The transmitting node configures the size of the pre-scheduling period through the semi-static configuration information, and configures a period-related starting point of the pre-scheduling period through the dynamic configuration information. Alternatively, the transmitting node configures the size and the starting point of the pre-scheduling period through the semi-static configuration information.

In an optional embodiment, the transmitting node configures the size and/or the starting point of the repetition period through the dynamic and/or semi-static configuration information in the following manners: the transmitting node configures the size and/or the starting point of the pre-scheduling period through the semi-static configuration information and takes the configured size and/or starting point of the pre-scheduling period as a scheduling transmission baseline; and the transmitting node reconfigures the size and/or the starting point of the pre-scheduling period taken as the scheduling transmission baseline via the dynamic configuration signaling. In this embodiment, the transmitting node may configure the size and/or the starting point of the pre-scheduling period through the semi-static configuration information and takes the pre-configured size and/or starting point of the pre-scheduling period as a scheduling transmission criterion for data transmission, and the transmitting node is allowed to reconfigure the size and/or the starting point of the pre-scheduling period through the dynamic configuration information as the scheduling transmission criterion for data transmission.

In an optional embodiment, the method further includes the following step: the transmitting node assumes the size and/or the starting point of the pre-scheduling period with the receiving node.

In an optional embodiment, after the transmitting node assumes the size and/or the starting point of the pre-scheduling period with the receiving node, the method further includes the following steps: the transmitting node takes the size and/or the starting point of the pre-scheduling period assumed with the receiving node as the scheduling transmission baseline, and the transmitting node reconfigures the size and/or the starting point of the pre-scheduling period taken as the scheduling transmission baseline via the dynamic configuration signaling. In this embodiment, the size and/or the starting point of the pre-scheduling period may be temporarily configured according to the service transmission requirements. In this embodiment, the transmitting node may take the size and/or the starting point of the pre-scheduling period assumed with the receiving node as the scheduling transmission criterion for data transmission, and the transmitting node is allowed to reconfigure the size and/or the starting point of the pre-scheduling period through the dynamic configuration information as the scheduling transmission criterion for data transmission.

In an optional embodiment, the size of the pre-scheduling period is an absolute time amount or a relative time amount. When the size of the pre-scheduling period is the absolute time amount, the pre-scheduling period is an absolute duration. When the size of the pre-scheduling period is the relative time amount, the size of the pre-scheduling period is determined based on at least one of the following determination information: a total number of orthogonal frequency division multiplexing (OFDM) symbols, a total number of scheduling units, a total number of subframes, a total number of timeslots and a total number of scheduling triggering timings. In this embodiment, the size of the pre-scheduling period is computed based on one or more of the above determination information.

In an optional embodiment, when the size of the pre-scheduling period is determined according to at least one of the determination information, at least one pre-scheduling period includes at least one of: the OFDM symbols of different durations, the scheduling units of different durations, the subframes of different durations and timeslots of different durations; and/or only one pre-scheduling period includes at least one of: the OFDM symbols of the same duration, the scheduling units of the same duration, the subframes of the same duration and timeslots of the same duration.

In an optional embodiment, a level of the configuration information (for example, the size and/or the starting point of a scheduling period) of the pre-scheduling period includes at least one of: a cell level, a beam level, a level of a receiving node (such as a level of a user equipment (UE)), a carrier level, a service type level, a level of a group of receiving nodes (such as a level of a group of UEs), a beam group level, a cell group level, a carrier group level and a level of a group of service types. In this embodiment, the level of the receiving node refers to that each receiving node corresponds to one size and/or one starting point of the pre-scheduling period and has corresponding configuration information of the pre-scheduling period and scheduling triggering timings. In this embodiment, the above various levels may be selected according to different service requirements and the various levels are not superior or inferior to each other.

In an optional embodiment, when the configuration information of the pre-scheduling period is at the level of the receiving node, the size and/or the starting point of the pre-scheduling period configured through the configuration information is directed to the receiving node and the pre-scheduling period includes at least one scheduling triggering timing; the transmitting node transmits the scheduling triggering information at the at least one scheduling triggering timing, and the receiving node transmits data after the receiving node detects the scheduling triggering information. Alternatively, when the configuration information of the pre-scheduling period is at the level of the receiving node, the size and/or the starting point of the pre-scheduling period configured through the configuration information is directed to the receiving node and the pre-scheduling period includes the at least one scheduling triggering timing; the receiving node directly transmits the data at the at least one scheduling triggering timing. The configuration in this case includes resource allocation information and/or modulation and coding information.

In an optional embodiment, the configuration information of the pre-scheduling period includes at least one of: the size and/or the starting point of the pre-scheduling period and coding-related information within the pre-scheduling period during data transmission. The coding-related information includes at least one of: at least one piece of modulation and coding information, at least one beamforming parameter (which may be referred to as pre-coding information), at least one piece of transport block size information, a parameter for instructing to transmit, in the current pre-scheduling period, the configuration information of the pre-scheduling period of a next pre-scheduling period and resource allocation information.

In an optional embodiment, when the coding-related information includes the transport block size information of a plurality of transport block sizes, the receiving node needs to separately prepare the data to be transmitted according to the plurality of transport block sizes, which includes separately performing an inter-layer packaging process. When the coding-related information includes a plurality of pieces of transport block size information with respective corresponding modulation and coding information, the receiving node needs to separately prepare the data to be transmitted according to the plurality of pieces of transport block size information with the respective corresponding modulation and coding information, which includes separately performing the inter-layer packaging process and a modulation and coding process. When the coding-related information includes the plurality of pieces of transport block size information and a plurality of pieces of modulation and coding information, the receiving node needs to separately prepare the data to be transmitted according to a combination of the plurality of pieces of transport block size information and the plurality of pieces of modulation and coding information, which includes separately performing the inter-layer packaging process, the modulation and coding process and a beamforming process. When the coding-related information includes the plurality of pieces of transport block size information, the plurality of pieces of modulation and coding information and a plurality of beamforming parameters, the receiving node needs to separately prepare the data to be transmitted according to a combination of values of the plurality of pieces of transport block size information, the plurality of pieces of modulation and coding information and the plurality of beamforming parameters, which includes separately performing the inter-layer packaging process, the modulation and coding process and the beamforming process.

In an optional embodiment, the scheduling triggering information includes at least one of: the resource allocation information, transmitting triggering information, a specific time or scheduling unit for transmitting the data to be transmitted, an identifier of the receiving node and indication information for indicating the data to be transmitted. The indication information for indicating the data to be transmitted is used for notifying the receiving node to select current data to be transmitted from more than two pieces of data to be transmitted prepared according to the configuration information of the pre-scheduling period. The transmitting triggering information is used for notifying the receiving node to transmit the prepared data to be transmitted at a specific transmitting time which is a pre-assumed scheduling unit after the transmitting triggering information has been received.

The embodiment provides another data transmission method. FIG. 3 is method flowchart 2 according to an embodiment of the present disclosure. As shown in FIG. 3, the method includes steps described below.

In step S302, a receiving node receives configuration information of a pre-scheduling period transmitted from a transmitting node.

In step S304, the receiving node prepares data to be transmitted according to the configuration information of the pre-scheduling period.

In step S306, the receiving node transmits the data to be transmitted.

In the above steps, the receiving node receives the configuration information of a repetition period transmitted from the transmitting node and prepares the data to be transmitted in advance according to the configuration information of the pre-scheduling period; then the receiving node may further receive scheduling triggering information transmitted from the transmitting node and transmit the data to be transmitted according to the scheduling triggering information. Alternatively, the receiving node transmits the data to be transmitted in an assumed manner assumed with the transmitting node, thereby shortening a time interval between transmitting the scheduling triggering information and the data to be transmitted. Apparently, the method is also favorable to reduce signaling overheads, for example, overheads of the scheduling triggering information may be much less than the existing overheads of uplink authorization information in the LTE. Therefore, the present disclosure may solve the problem in the existing art of a large feedback time interval after data transmission and achieve effects of shortening a data transmission time interval and improving data transmission efficiency.

Optionally, the above steps may, but may not necessarily, be executed by a terminal.

In an optional embodiment, the receiving node transmits the data to be transmitted through one of the following steps: the receiving node receives the scheduling triggering information transmitted from the transmitting node and transmits the data to be transmitted according to the scheduling triggering information; the receiving node transmits the data to be transmitted in a manner assumed with the transmitting node at a scheduling triggering timing; and the receiving node transmits the data to be transmitted at the scheduling triggering timing of the pre-scheduling period according to the configuration information of the pre-scheduling period. The pre-scheduling period includes at least one scheduling triggering timing.

In an optional embodiment, the receiving node receives the scheduling triggering information transmitted from the transmitting node through the following steps: the receiving node determines the scheduling triggering timing; and the receiving node receives the scheduling triggering information at the scheduling triggering timing.

In an optional embodiment, the receiving node determines the scheduling triggering timing in at least one of the following manners: the receiving node determines a scheduling triggering timing configured by the transmitting node, determines a scheduling triggering timing assumed by the transmitting node and the receiving node, determines a scheduling triggering timing dynamically acquired according to service transmission requirements, determines a scheduling triggering timing configured through the configuration information of the pre-scheduling period, and determines the scheduling triggering timing according to a size and/or a starting point of the pre-scheduling period. In this embodiment, the scheduling triggering timing is determined according to the size and/or the starting point of the pre-scheduling period when the pre-scheduling period includes one scheduling triggering timing.

In an optional embodiment, the receiving node transmits the data to be transmitted according to the scheduling triggering information in the following manner: the receiving node transmits the data to be transmitted in a manner assumed with the transmitting node at a predetermined time after the scheduling triggering information has been received.

In an optional embodiment, the receiving node receives the configuration information of the pre-scheduling period transmitted from the transmitting node through the following step: the receiving node determines a pre-scheduling period timing pre-configured by the transmitting node or assumed with the transmitting node and receives the configuration information of the pre-scheduling period transmitted from the transmitting node at the pre-scheduling period timing; or the receiving node determines the scheduling triggering timing for receiving the configuration information of the pre-scheduling period and receives the configuration information of the pre-scheduling period transmitted from the transmitting node at the scheduling triggering timing; or the receiving node determines a transmitting position pre-configured by the transmitting node or assumed with the transmitting node and receives the configuration information of the pre-scheduling period transmitted from the transmitting node at the transmitting position.

In an optional embodiment, a position of the pre-scheduling period timing for transmitting the configuration information of a current pre-scheduling period includes one of: a starting point of the current pre-scheduling period, an ending point of a previous pre-scheduling period, an assumed point in the previous pre-scheduling period, a point configured via predetermined signaling in the previous pre-scheduling period and a scheduling triggering timing configured or assumed via the predetermined signaling in the previous pre-scheduling period. In this embodiment, the predetermined signaling is transmitted in the configuration information of the previous pre-scheduling period. The receiving node may also receive, from the configuration information of the current pre-scheduling period, a parameter of the configuration information of a next pre-scheduling period transmitted in the current pre-scheduling period, where the parameter depicts position information.

In an optional embodiment, a level of the predetermined signaling includes at least one of: a cell level, a beam level, a level of a transmitting node (such as a level of a user equipment (UE)), a carrier level, a service type level, a level of a group of transmitting nodes (such as a level of a group of UEs), a beam group level, a cell group level, a carrier group level and a level of a group of service types.

In an optional embodiment, the receiving node receives the configuration information of the pre-scheduling period transmitted from the transmitting node through the following steps: the receiving node receives configuration signaling transmitted from the transmitting node and the receiving node determines the configuration information of the pre-scheduling period according to the configuration signaling.

In an optional embodiment, the configuration signaling from the transmitting node is received through the following steps: the receiving node receives the configuration signaling transmitted from the transmitting node through a higher-layer system broadcast message; the receiving node receives the configuration signaling transmitted from the transmitting node through a dedicated radio resource control (RRC) message of the receiving node; the receiving node receives the configuration signaling transmitted from the transmitting node through a dedicated downlink or uplink physical control channel of the receiving node; and the receiving node receives the configuration signaling transmitted from the transmitting node through a common downlink or uplink physical control channel.

In an optional embodiment, the receiving node receives the configuration information of the pre-scheduling transmitted from the transmitting node in at least one of the following manners: the receiving node receives the configuration information transmitted from the transmitting node through the higher-layer system broadcast message; the receiving node receives the configuration information transmitted from the transmitting node through the dedicated radio resource control (RRC) message of the receiving node; the receiving node receives the configuration information transmitted from the transmitting node through the dedicated downlink or uplink physical control channel of the receiving node; and the receiving node receives the configuration information transmitted from the transmitting node through the common downlink or uplink physical control channel.

In an optional embodiment, the configuration information of the pre-scheduling period includes at least one of: the size and/or the starting point of the pre-scheduling period and coding-related information within the pre-scheduling period during data transmission. The coding-related information includes at least one of: at least one piece of modulation and coding information, at least one beamforming parameter, at least one piece of transport block size information, a parameter for instructing to transmit, in the current pre-scheduling period, the configuration information of the pre-scheduling period of a next pre-scheduling period and resource allocation information.

In an optional embodiment, when the coding-related information includes the transport block size information of a plurality of transport block sizes, the receiving node needs to separately prepare the data to be transmitted according to the plurality of transport block sizes, which includes separately performing an inter-layer packaging process. When the coding-related information includes a plurality of pieces of transport block size information with respective corresponding modulation and coding information, the receiving node needs to separately prepare the data to be transmitted according to the plurality of pieces of transport block size information with the respective corresponding modulation and coding information, which includes separately performing the inter-layer packaging process and a modulation and coding process. When the coding-related information includes the plurality of pieces of transport block size information and a plurality of pieces of modulation and coding information, the receiving node needs to separately prepare the data to be transmitted according to a combination of the plurality of pieces of transport block size information and the plurality of pieces of modulation and coding information, which includes separately performing the inter-layer packaging process, the modulation and coding process and a beamforming process. When the coding-related information includes the plurality of pieces of transport block size information, the plurality of pieces of modulation and coding information and a plurality of beamforming parameters, the receiving node needs to separately prepare the data to be transmitted according to a combination of values of the plurality of pieces of transport block size information, the plurality of pieces of modulation and coding information and the plurality of beamforming parameters (that is, the plurality of pieces of transport block size information, the plurality of pieces of modulation and coding information and the plurality of beamforming parameters separately correspond to a plurality of values and a combination of different values of the three parameter is made), which includes separately performing the inter-layer packaging process, the modulation and coding process and the beamforming process.

In an optional embodiment, the size and/or the starting point of the pre-scheduling period is configured via dynamic configuration signaling and/or semi-static configuration signaling.

In an optional embodiment, the method further includes the following step: the receiving node determines the size and/or the starting point of the pre-scheduling period via the semi-static configuration signaling, takes the configured size and/or starting point of the pre-scheduling period as a scheduling transmission baseline, and determines a change of the size and/or the starting point of the pre-scheduling period taken as the scheduling transmission baseline via the dynamic configuration signaling.

In an optional embodiment, the size and/or the starting point of the pre-scheduling period is configured via the dynamic configuration signaling and/or the semi-static configuration signaling in one of the manners described below. The receiving node receives and determines the size of the pre-scheduling period via the semi-static configuration signaling and the receiving node receives and determines a period-related starting point of the pre-scheduling period via the dynamic configuration signaling. The receiving node receives and determines the size and the starting point of the pre-scheduling period via the semi-static configuration signaling. The receiving node determines the size and/or the starting point of the pre-scheduling period via the semi-static configuration signaling and takes the configured size and/or starting point of the pre-scheduling period as a scheduling transmission criterion for data transmission, and the receiving node is allowed to reconfigure the size and/or the starting point of the pre-scheduling period taken as the scheduling transmission criterion for data transmission through dynamic configuration information.

In an optional embodiment, the scheduling triggering information includes at least one of: the resource allocation information, transmitting triggering information, a specific time or scheduling unit for transmitting the data to be transmitted, an identifier of the receiving node and indication information for indicating the data to be transmitted. The indication information for indicating the data to be transmitted is used for notifying the receiving node to select current data to be transmitted from more than two pieces of data to be transmitted prepared according to the configuration information of the pre-scheduling period. The transmitting triggering information is used for notifying the receiving node to transmit the prepared data to be transmitted at a specific transmitting time which is a pre-assumed scheduling unit after the transmitting triggering information has been received.

In an optional embodiment, a level of the configuration information of the pre-scheduling period includes at least one of: a cell level, a beam level, a level of a receiving node, a carrier level, a service type level, a level of a group of receiving nodes, a beam group level, a cell group level, a carrier group level and a level of a group of service types. The level of the receiving node refers to that each receiving node corresponds to one size and/or one starting point of the pre-scheduling period and has corresponding configuration information of the pre-scheduling period and scheduling triggering timings.

In an optional embodiment, when the configuration information of the pre-scheduling period is at the level of the receiving node, the size and/or the starting point of the pre-scheduling period configured through the configuration information is directed to the receiving node and the pre-scheduling period includes at least one scheduling triggering timing; the transmitting node transmits the scheduling triggering information at the at least one scheduling triggering timing and the receiving node transmits data after the receiving node detects the scheduling triggering information. Alternatively, when the configuration information of the pre-scheduling period is at the level of the receiving node, the size and/or the starting point of the pre-scheduling period configured through the configuration information is directed to the receiving node and the pre-scheduling period includes the at least one scheduling triggering timing; the receiving node directly transmits the data at the at least one scheduling triggering timing. The configuration in this case includes the resource allocation information and/or the modulation and coding information.

The present disclosure will be described hereinafter in conjunction with specific embodiments.

Figure 4:
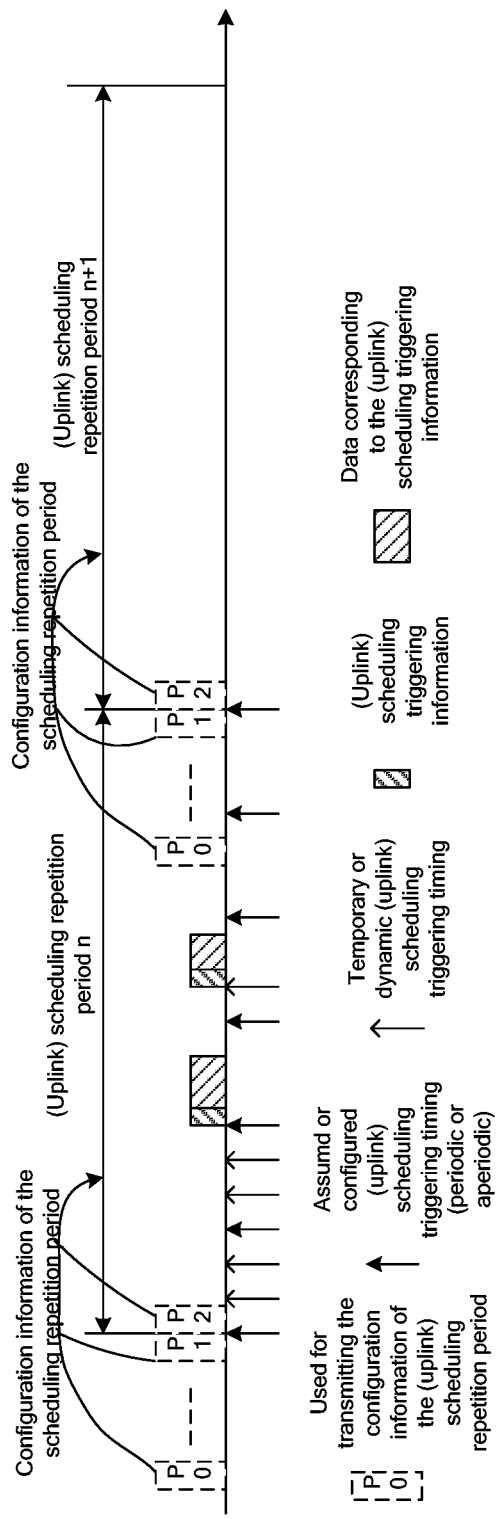
FIG. 4 is a schematic diagram of a basic structure according to an embodiment of the present disclosure.

FIG. 4 is a schematic diagram illustrating a basic structure according to an embodiment of the present disclosure. A transmitting node may divide time domain into a plurality of pre-scheduling periods (equivalent to scheduling repetition periods in FIG. 4 which are the same below). The pre-scheduling period may be periodic or aperiodic. For example, in the case of aperiodic pre-scheduling periods, configuration information of the pre-scheduling period may be primary control information at a level of a user equipment (UE) (corresponding to the receiving node described above). Secondary control information (such as triggering signaling) is transmitted at a triggering timing in FIG. 4, and then the UE may operate. Related operations of periodic pre-scheduling periods are described below. These operations may be performed for the aperiodic pre-scheduling periods.

In FIG. 4, positions 0, 1 and 2 (P0, P1, P2) are positions where the configuration information of the pre-scheduling period may be transmitted. As shown in FIG. 4, at the positions 0 and 1, the configuration information of a next pre-scheduling period is transmitted in a previous pre-scheduling period. The position 0 is preferred because a certain interval exists between the position 0 and the next pre-scheduling period. The UE may prepare in advance data to be transmitted in the next pre-scheduling period (corresponding to the data to be transmitted described above) according to the configuration information of the pre-scheduling period so that rapid transmission of uplink data may be directly implemented at a starting point of the next pre-scheduling period. In FIG. 4, an assumed or configured scheduling triggering timing may be separate from or mixed with a temporary or dynamic scheduling triggering timing.

Specific Embodiment 1

Figure 5:
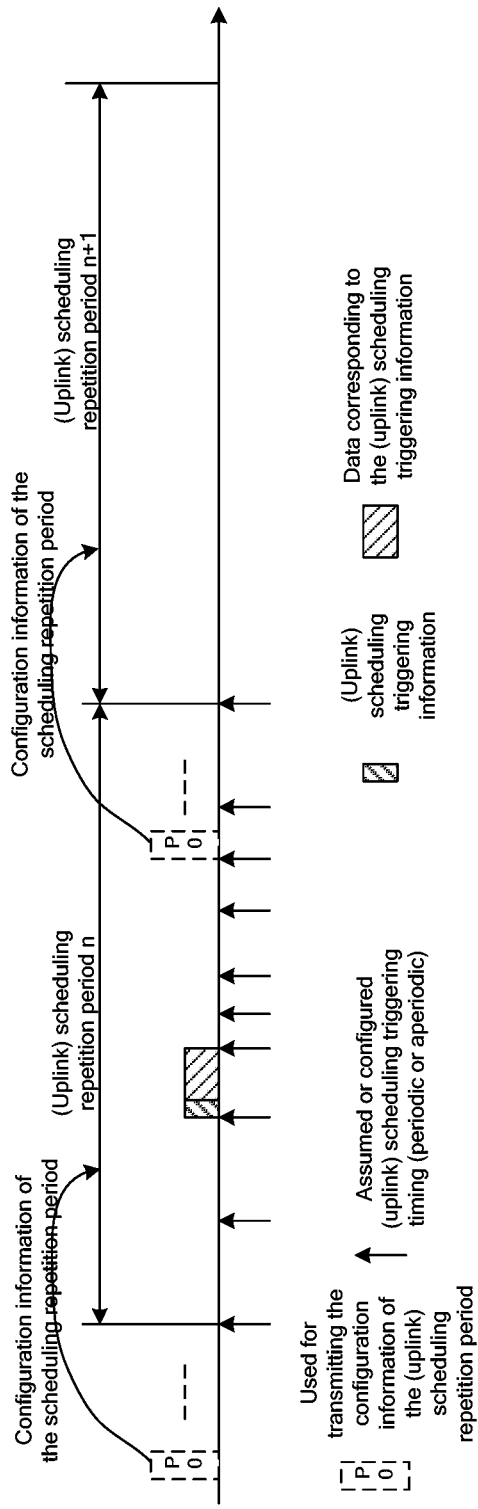
FIG. 5 is a schematic diagram of a specific structure according to an embodiment of the present disclosure.

FIG. 5 is a schematic diagram illustrating a specific structure according to a specific embodiment of the present disclosure. A transmitting node divides time domain into a plurality of pre-scheduling periods and configures a plurality of scheduling triggering timings in the pre-scheduling period. Alternatively, it may be understood that an interval between a scheduling triggering timing and a next scheduling triggering timing is equivalent to a scheduling unit, that is, one pre-scheduling period (or referred to as a scheduling period or a scheduling repetition period) includes a plurality of scheduling units which may also be referred to as a time interval. The transmitting node transmits information such as a size and a starting point of the pre-scheduling period to a receiving node. For example, the size of the pre-scheduling period is configured as four scheduling units (one scheduling unit includes 14 orthogonal frequency division multiplexing (OFDM) symbols which may have different durations), and a starting point of the scheduling units is a scheduling unit numbered 0.

Furthermore, the transmitting node configures a position for transmitting the configuration information of the pre-scheduling period (may also assume with the receiving node) and transmits the configuration information of the pre-scheduling period to the receiving node. For example, the transmit terminal configures that the configuration information of the pre-scheduling period of pre-scheduling period n+1 is transmitted at a starting point of the penultimate scheduling unit in pre-scheduling period n, and position signaling for transmission of the configuration information of pre-scheduling period n+1 is transmitted in the configuration information of the pre-scheduling period of pre-scheduling period n. Therefore, after receiving the configuration information of the pre-scheduling period of the pre-scheduling period n+1 in the pre-scheduling period n, the receiving node has a duration of nearly two scheduling units to prepare data to be transmitted for the pre-scheduling period n+1. Apparently, if the duration of two scheduling units is sufficient, a transmitting position of the configuration information of the pre-scheduling period may also be changed to reduce the time for preparing the data to be transmitted. If the duration of two scheduling units is relatively small, the time for preparing the data to be transmitted may be appropriately increased.

Furthermore, here the pre-scheduling period is assumed to be at a cell level. That is, in the pre-scheduling period, services of all UEs in a cell are allowed to be or not to be scheduled and transmitted in a manner of the pre-scheduling period.

The configuration information of the pre-scheduling period configured by the transmitting node includes: modulation and coding information (similar to an existing MCS table in the LTE), beam pre-coding information and a position of the scheduling triggering timing when a service (referring to a service transmitted according to a mechanism of the pre-scheduling period) is transmitted in the corresponding pre-scheduling period. For all receiving nodes which need to perform transmission according to the pre-scheduling period, after receiving the above information, the receiving nodes start to prepare data to be transmitted (corresponding to the data to be transmitted described above), which includes modulation, coding, beamforming, inter-layer packaging and the like performed on the data, and transmits the data at a transmitting timing.

The receiving nodes receive scheduling triggering information at the configured scheduling triggering timing. If one receiving node detects its own scheduling triggering information (the scheduling triggering information includes UE identification information and resource allocation information), the receiving node transmits the prepared data to be transmitted at an assumed time (corresponding to the scheduling triggering timing described above). For example, the assumed time has an interval of a plurality of (such as two to three) OFDM symbols after a symbol for transmitting the scheduling triggering information. Since the scheduling triggering information is decoded very quickly and the receiving node has prepared in advance the data to be transmitted, the data to be transmitted may be transmitted only in a few symbols. Apparently, the time is much less than an existing interval 4 ms between uplink authorization information and uplink data in the LTE.

Specific Embodiment 2

Based on the specific embodiment 1, it is assumed in the specific embodiment 2 that a transmission manner of the pre-scheduling period is at a service level. For example, for a service with low latency requirements, data (for example, uplink data) transmission must be performed in this manner of the pre-scheduling period. In this case, a receiving node with the low latency service requirements needs to perform the data transmission as the receiving nodes described above.

Specific Embodiment 3

Based on the specific embodiment 1, it is assumed in the specific embodiment 3 that a transmission manner of the pre-scheduling period is at a UE level. For example, a base station may configure the transmission mode for a UE supporting the transmission manner of the pre-scheduling period to perform data transmission according to transmission requirements of the UE. In this case, the UE which has been configured with the transmission manner of the pre-scheduling period needs to perform the data transmission in a processing manner of receiving nodes in the specific embodiment 1.

Specific Embodiment 4

Based on the specific embodiments 1 and 3 described above, the scheduling triggering information transmitted at the scheduling triggering timing in the pre-scheduling period in the specific embodiment 1 does not include resource allocation information, and the resource allocation information is included in configuration information of the pre-scheduling period. The scheduling triggering information includes UE identification information. When the scheduling triggering information received by a UE at the scheduling triggering timing includes its own identification information, the UE transmits prepared uplink data.

Specific Embodiment 5

Based on the specific embodiments 1, 2 and 3 described above, an instant transmission mechanism, a dynamic or temporary scheduling triggering timing, of a UE is further introduced in the specific embodiment 1. After the transmission mechanism is configured for a receiving node, the receiving node prepares data to be transmitted according to configuration information of a pre-scheduling period, and transmits the prepared data to be transmitted according to an assumed rule after receiving scheduling triggering information including its own identification information at the scheduling triggering timing. In addition, if new data needs to be transmitted during the pre-scheduling period and a next scheduling triggering timing is still on the way, the receiving node is allowed to perform data transmission at the temporary scheduling triggering timing. Specifically, the receiving node still prepares the data to be transmitted according to the configuration information of the pre-scheduling period. When the data to be transmitted has been prepared, there is still a large interval from the next scheduling triggering timing and a temporary scheduling triggering timing exists before the next scheduling triggering timing. At this time, the receiving node is allowed to transmit the prepared data to be transmitted at the temporary scheduling triggering timing. In this case, the configuration information of the pre-scheduling period includes resource allocation information (which may not be included if the resource allocation information is assumed or occupies an entire bandwidth), and the resource allocation information is included in the configuration information of the pre-scheduling period for UEs which needs to use the temporary scheduling triggering timing. The temporary scheduling triggering timing also needs to be configured by a transmitting node, for example, the temporary scheduling triggering timing is included in the configuration information of the pre-scheduling period.

Specific Embodiment 6

Based on the specific embodiment 5 described above, a temporary scheduling triggering timing is determined by requirements of a receiving node on uplink data transmission. For example, in the specific embodiment 5, when the receiving node has prepared data to be transmitted according to configuration information of a pre-scheduling period during the pre-scheduling period, there is still a large interval from a next scheduling triggering timing; at this time, the receiving node immediately transmits uplink data on a next symbol after the data to be transmitted has been prepared. In this case, the receiving node uses resource allocation information included in the configuration information of the pre-scheduling period. To reduce collisions between resources for transmitting data at the temporary scheduling triggering timing and different receiving nodes, a transmitting node needs to control a number of occurrences of this type of transmission as much as possible. For example, the receiving nodes authorized by the transmitting node (allowed to transmit data in this way) can transmit data according to this specific embodiment.

Specific Embodiment 7

Based on the specific embodiments 1, 2, 3, 4 and 5 described above, a transmitting node can include level information of multiple modulation and coding schemes (MCSs) in configuration information of a pre-scheduling period, and the receiving node can prepare and transmit uplink data according to one of the above schemes. The prepared data to be transmitted is transmitted at a temporary scheduling triggering timing. This manner is suitable for the case where resource allocation information is assumed, for example, an entire bandwidth is exclusive to the receiving node, and the number of OFDM symbols is assumed. In this case, the receiving node, a UE, can select one appropriate level from multiple MCS levels according to a size of the data to be transmitted. The transmitting node (equivalent to a base station) needs to attempt to receive and decode data according to the configured level information of multiple MCSs at the temporary scheduling triggering timing.

Specific Embodiment 8

When data to be transmitted is transmitted based on a pre-scheduling period, the following problems need to be noted as for the specific configuration of the pre-scheduling period. An appropriate size of the pre-scheduling period is configured. A granularity of link adaptation, a granularity of channel quality changes in a link (or changes of a channel quality indication (CQI) parameter), needs to be considered. For example, a period of link changes is generally counted in microseconds, that is, the channel quality may be considered to be unchanged within tens of microseconds; therefore, the size of the pre-scheduling period should be equal to the granularity of channel quality changes in the link and be tens of microseconds, for example. In this way, MCS information (modulation and coding information) in configuration information of the pre-scheduling period is adaptable to an entire pre-scheduling period so that a transmission mechanism based on the pre-scheduling period is also adaptable to the link adaptation.

The pre-scheduling period is adaptable to low-latency services which generally adopts OFDM symbols with very small durations such as a few micrometers. Therefore, tens of microseconds may also be divided into multiple OFDM symbols and then subdivided into multiple scheduling triggering timings in one pre-scheduling period.

Specific Embodiment 9

A pre-scheduling period in the specific embodiments described above may also be discontinuous or aperiodic. For example, a specific position of the pre-scheduling period is configured by a transmitting node (a base station). The transmitting node transmits configuration information of the pre-scheduling period at the same time.

A receiving node (a UE) may transmit uplink data at an assumed or temporary trigger timing and process the uplink data according to the configuration information of the pre-scheduling period. The configuration information includes at least one of at least one pieces of modulation and coding information, at least one piece of transport block size information, at least one piece of beam parameter information and a size and position of resources usable by each receiving node (that is, the size and position of used resources assumed with the transmitting node). Information excluded in the configuration information may be pre-assumed by the transmitting node with the receiving node to reduce signaling overheads.

Specific Embodiment 10

In an example 1, in configuration information of a pre-scheduling period (or understood as first uplink authorization information, which is similar to other embodiments), a transmitting node (such as a base station) configures multiple transport block sizes, which may be directed to a certain UE or shared by multiple UEs (or directed to all UEs in the pre-scheduling period). The UE separately performs transport block data packaging and the like in advance according to the transport block sizes in the configuration information of the pre-scheduling period and then determines to transmit one of the prepared transport block data packets according to triggering information at a triggering timing. In this specific embodiment, the base station configures two candidate transport block sizes, 500 bits and 1000 bits, for a UE1 in the configuration information of a pre-scheduling period n, and then the UE1 separately performs inter-layer packaging on data according to the 500 bits and the 1000 bits. The base station transmits, at the triggering timing in the pre-scheduling period n, triggering signaling of the UE1 (or understood as second uplink authorization information of the UE1 different from the first uplink authorization information, which is similar to the other embodiments) and configures uplink resources (including a size and/or a position), a modulation mode, a coding mode, a beam parameter (if any) and the like for the UE1 (or may configure some of the above parameters and pre-assume the remaining parameters). In this case, the UE1 will select one from the data packets completed in advance according to two candidate transport blocks, reprocess the selected data packet according to information in the triggering signaling, and transmit the reprocessed data packet. The base station performs blind detection and reception according to two possible candidate packets.

In an example 2, based on the description in the example 1, the base station instructs, in the triggering signaling, the UE1 to transmit uplink data according to which candidate transport block. For example, the base station instructs the UE1 to perform packaging in advance for uplink data transmission according to the size of 1000 bits, and the UE1 performs packaging in advance according to the transport block of 1000 bits and reprocesses and transmits the packet according to information in the triggering signaling. In this case, the base station no longer performs blind detection and may perform data reception and processing according to the packet of the transport block of 1000 bits. Compared with the above specific embodiment, additional overheads are required to instruct the UE to perform the uplink data transmission according to which transport block, but the base station has low detection and reception complexity.

In the specific embodiments described above, an existing interval between the uplink authorization information and the corresponding uplink data transmission may be shortened, and the shortened time is mainly the packaging time. Before the triggering signaling (which may also be understood as the uplink authorization information), the transmitting node performs various possible packaging in advance according to the candidate transport blocks and accelerates the uplink data transmission after the triggering signaling. Alternatively, the time for the packaging is reduced between the triggering signaling and the corresponding uplink data transmission, thereby reducing a time interval between the triggering signaling and the corresponding uplink data transmission.

Specific Embodiment 11

In an example 1, in configuration information of a pre-scheduling period, a transmitting node (such as a base station) configures multiple modulation and coding levels (for example, transport block sizes (or frequency domain resource size information) and/or precoding information may also be included; if not included, the transport block sizes (or frequency domain resource sizes) and/or the pre-coding information need to be assumed). The above configuration may be directed to a certain UE or shared by multiple UEs (or directed to all UEs in the pre-scheduling period). According to the modulation and coding levels in the configuration information of the pre-scheduling period, the UE performs data packaging, modulation and coding, etc. in advance according to various candidate modulation and coding levels to obtain data to be transmitted and then determines to transmit which kind of data to be transmitted according to triggering information at the triggering timing. For example, the base station configures two candidate modulation and coding levels, a level 1 and a level 2, for a UE1 in the configuration information of a pre-scheduling period n, and then the UE1 separately prepares the data to be transmitted according to the level 1 and the level 2. The base station transmits, at the triggering timing in the pre-scheduling period n, triggering signaling of the UE1 (or understood as uplink authorization information of the UE1) and configures uplink resources (including a position), a beam parameter (if any) and the like for the UE1 (or may configure some of the above parameters and pre-assume the remaining parameters). In this case, the UE1 will select one from two kinds of candidate data to be transmitted, reprocess (map) the selected data according to information in the triggering signaling, and transmit the reprocessed data. The base station performs blind detection and reception according to two possible candidate packets.

In an example 2, based on the description in the example 1, the base station instructs, in the triggering signaling, the UE1 to transmit which kind of candidate data to be transmitted. For example, the base station instructs the UE1 to prepare the data to be transmitted according to the level 1 for uplink data transmission, and the UE1 prepares the data to be transmitted according to the level 1, reprocesses the data to be transmitted according to information in the triggering signaling and transmits the reprocessed data. In this case, the base station no longer performs blind detection and may perform data reception and processing according to the level 1. Compared with the example 1, additional overheads are required to instruct the UE to perform the uplink data transmission according to which modulation and coding level, but the base station has low detection and reception complexity.

As described above, an existing interval between the uplink authorization information and the corresponding uplink data transmission may be shortened, and the shortened time is mainly packaging time and modulation and coding time. Before the triggering signaling (which may also be understood as the uplink authorization information), the transmitting node performs various possible packaging and modulation and coding in advance according to the candidate modulation and coding levels and accelerates the uplink data transmission after the triggering signaling. Alternatively, the time for the packaging and the modulation and coding is reduced between the triggering signaling and the corresponding uplink data transmission, thereby reducing a time interval between the triggering signaling and the corresponding uplink data transmission.

Specific Embodiment 12

Based on the specific embodiments 10 and 11 described above, a processing manner in this specific embodiment is further included. According to configuration from a base station, a UE prepares data in advance according to various possible candidate transport blocks or modulation and coding levels. When the base station transmits triggering timing again, the base station no longer instructs, in the triggering signaling, the UE to transmit uplink data corresponding to which candidate transport block or modulation and coding level. The UE may select the uplink data corresponding to one candidate transport block or modulation and coding level for transmission and transmit identification information at the same time. The identification information is used for describing that the UE transmits the uplink data corresponding to which candidate transport block or modulation and coding level. The UE may transmit the identification information on resources for transmitting the corresponding uplink data, or the base station and the UE may appoint a certain position in advance to transmit the identification information.

Apparently, this specific embodiment has the following feature: the UE may determine to use which transport block or modulation and coding level to process the uplink data and then transmit the prepared data to the base station; at the same time, the UE transmits the information on the specific transport block or modulation and coding level to the base station (for example, the UE transmits control information), but frequency domain resources (such as a size and/or position of the frequency domain resources) are still allocated by the base station and the UE is notified of the frequency domain resources by the base station.

Specific Embodiment 13

Referring to FIG. 5, it may also be set that configuration information of a pre-scheduling period is substantially unchanged. For example, the configuration information of the pre-scheduling period may generally be unchanged in multiple continuous pre-scheduling periods. The configuration information of the pre-scheduling period may be transmitted in the manner described below and a receiving node may also perform a reverse reception of the configuration information.

The configuration information of the pre-scheduling period is transmitted (for example, at a position 0) as the configuration information of a next pre-scheduling period n. If a pre-scheduling period n+1, a pre-scheduling period n+2 and a pre-scheduling period n+3 are all unchanged, the configuration information is no longer transmitted as the configuration information of the pre-scheduling period corresponding to the pre-scheduling period n+1, the pre-scheduling period n+2 and the pre-scheduling period n+3, but a few bits are transmitted to described whether the configuration information changes or not with respect to a previous pre-scheduling period. If the configuration information does not change, signaling indicates that the configuration information does not change, or otherwise new configuration information of the pre-scheduling period is transmitted. Apparently, the above manner may effectively reduce signaling overheads when the configuration information of the pre-scheduling period is substantially unchanged.

Specific Embodiment 14

Based on the specific embodiment 13, if configuration information of a pre-scheduling period is substantially unchanged, the configuration information of the pre-scheduling period may be transmitted through a higher-layer RRC message, including a dedicated RRC message at a UE level or a broadcast RRC message at a cell level or a an RRC message at a beam level. It may also be transmitted through control information of the physical layer. Higher-layer signaling overheads are not as demanding as physical layer signaling overheads and are also suitable for slow changes. Therefore, the physical layer signaling overheads are reduced.

Specific Embodiment 15

The above manners based on each specific embodiment (such as the specific embodiment 1) may be adopted on a certain carrier in the following manner: the carrier is divided into multiple subbands and each subband may implement the above manners independently according to the specific embodiments described above. The carrier, as an entire bandwidth, may implement the above manners independently according to the specific embodiments described above. Part of the carrier is classified as a bandwidth which implements the above manners independently according to the specific embodiments described above.

Specific Embodiment 16

An improvement is proposed in this embodiment to be applied to the above scheduling manners: an uplink data scheduling manner based on a pre-scheduling period in each specific embodiment described above and an existing uplink data scheduling manner in the LTE.

A UE always prepares data to be transmitted according to various possible candidate uplink authorization information (corresponding to configuration information of a pre-scheduling period in each embodiment described above). For example, the candidate uplink authorization information includes multiple different transport block sizes and/or modulation and coding modes and/or pre-coding processing parameters, etc. The UE needs to prepare data to be transmitted according to each of the above candidate uplink authorization information. For another example, when the candidate uplink authorization information includes different content, a degree of preparing the data to be transmitted is different. For example, if the transport block sizes are included, the UE may only perform inter-layer packaging; or if the transport block sizes and the modulation and coding modes are included, the UE may perform the inter-layer packaging and physical player modulation and coding (including CRC addition, layer mapping, precoding processing (which may be included if the pre-coding processing parameters are included) and the like). The UE may be instructed by a base station to prepare the data to be transmitted according to the various candidate uplink authorization information, or the UE may always prepare the data to be transmitted according to multiple candidate modes (for example, when a total number of usable modulation and coding levels is small, the UE may prepare the data to be transmitted according to each modulation and coding level).

After receiving triggering signaling transmitted from the base station (including position information in frequency domain of resources indicating which one of the prepared data to be transmitted information is transmitted), the UE selects the corresponding data from the prepared data for transmission. At this time, an interval between a time for receiving the triggering signaling and a time for transmitting the prepared data may be very small because a data preparation process of the UE is omitted.

There are different technical features in the different embodiments described above. These technical features may be combined to obtain new features in different embodiments if not in collision.

From the description of the implementation modes described above, it will be apparent to those skilled in the art that the method in the embodiments described above may be implemented by software plus a necessary general-purpose hardware platform, or may of course be implemented by hardware. However, in many cases, the former is a preferred implementation mode. Based on such an understanding, the solutions provided by the present disclosure substantially, or the part contributing to the existing art, may be embodied in the form of a software product. The computer software product is stored in a storage medium (such as a ROM/RAM, a magnetic disk or an optical disk) and includes several instructions for enabling a terminal device (which may be a mobile phone, a computer, a server, a network device, or the like) to execute the method according to each embodiment of the present disclosure.

A data transmission apparatus is further provided in this embodiment. The apparatus is used for implementing the above-mentioned embodiments and preferred implementation modes. What has been described will not be repeated. As used below, the term "module" may be software, hardware or a combination thereof capable of implementing predetermined functions. The apparatus in the embodiments described below is preferably implemented by software, but implementation by hardware or by a combination of software and hardware is also possible and conceived.

Figure 6:
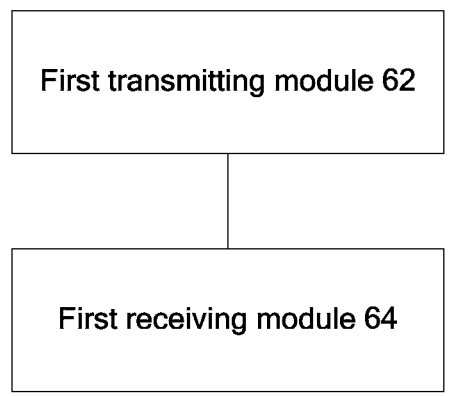
FIG. 6 is block diagram 1 illustrating a structure of a data transmission apparatus according to an embodiment of the present disclosure.

FIG. 6 is a block diagram 1 illustrating a data transmission apparatus according to an embodiment of the present disclosure. The apparatus may be applied to a transmitting node. As shown in FIG. 6, the apparatus includes a first transmitting module 62 and a first receiving module 64. The apparatus is described below.

The first transmitting module 62 is configured to transmit configuration information of a pre-scheduling period, where the configuration information of the pre-scheduling period is used for instructing a receiving node to prepare data to be transmitted according to the configuration information of the pre-scheduling period. The first receiving module 64 is connected to the first transmitting module 62 and is configured to receive the data to be transmitted which is transmitted from the receiving node.

In an optional embodiment, the apparatus further includes an information determination module. The information determination module is configured to determine the configuration information of the pre-scheduling period in the following manner: the information determination module configures the configuration information of the pre-scheduling period; or the information determination module assumes the configuration information of the pre-scheduling period with the receiving node.

In an optional embodiment, the first transmitting module 62 includes a first transmitting unit, a second transmitting unit or a third transmitting unit. The first transmitting module 62 is described below.

The first transmitting unit is configured to determine a pre-scheduling period timing pre-configured or assumed with the receiving node and transmit the configuration information of the pre-scheduling period to the receiving node at the pre-scheduling period timing. The second transmitting unit is configured to determine a scheduling triggering timing for transmitting the configuration information of the pre-scheduling period and transmit the configuration information of the pre-scheduling period to the receiving node at the scheduling triggering timing. The third transmitting unit is configured to determine a transmitting position pre-configured or assumed with the receiving node and transmit the configuration information of the pre-scheduling period at the transmitting position. The pre-scheduling period includes at least one scheduling triggering timing.

In an optional embodiment, a position of the pre-scheduling period timing for transmitting the configuration information of a current pre-scheduling period may include one of: a starting point of the current pre-scheduling period, an ending point of a previous pre-scheduling period, an assumed point in the previous pre-scheduling period, a point configured via predetermined signaling in the previous pre-scheduling period and a scheduling triggering timing configured or assumed via the predetermined signaling in the previous pre-scheduling period.

In an optional embodiment, the first receiving module 64 may receive the data to be transmitted which is transmitted from the receiving node in the following manner: the first receiving module 64 transmits the scheduling triggering information, used for instructing the receiving node to transmit the data to be transmitted, to the receiving node and receives the data to be transmitted which is transmitted from the receiving node; or the first receiving module 64 receives the data to be transmitted which is transmitted in the assumed manner by the receiving node at the scheduling triggering timing. In this embodiment, the scheduling triggering information is used for scheduling or triggering transmission of uplink service data.

In an optional embodiment, the first receiving module 64 may transmit the scheduling triggering information to the receiving node in the following manner: the first receiving module 64 determines the scheduling triggering timing and transmits the scheduling triggering information to the receiving node at the determined scheduling triggering timing; or the first receiving module 64 transmits the scheduling triggering information to the receiving node at the pre-scheduling period timing pre-configured or assumed with the receiving node.

In an optional embodiment, the scheduling triggering timing may include at least one of: a scheduling triggering timing configured by the transmitting node, a scheduling triggering timing assumed by the transmitting node with the receiving node, a scheduling triggering timing dynamically acquired according to service transmission requirements and a scheduling triggering timing configured through the configuration information of the pre-scheduling period.

In an optional embodiment, the first transmitting module 62 may transmit the configuration information of the pre-divided pre-scheduling period to the receiving node in the following manner: the first transmitting module 62 configures the configuration information of the pre-scheduling period for the receiving node via configuration signaling.

In an optional embodiment, the configuration information may be transmitted in at least one of the following manners: the configuration information is transmitted through a higher-layer system broadcast message; the configuration information is transmitted through a dedicated radio resource control (RRC) message of the receiving node; the configuration information is transmitted through a dedicated downlink or uplink physical control channel of the receiving node; and the configuration information is transmitted through a common downlink or uplink physical control channel.

In an optional embodiment, the apparatus further includes a configuration module. The configuration module is configured to configure a size and/or a starting point of the pre-scheduling period through dynamic and/or semi-static configuration information (which may be also referred to as the configuration signaling).

In an optional embodiment, the configuration module may preform configuration in one of the following manners: the configuration module configures the size of the pre-scheduling period through the semi-static configuration information and configures a period-related starting point of the pre-scheduling period through the dynamic configuration information; or the configuration module configures the size and the starting point of the pre-scheduling period through the semi-static configuration information.

In an optional embodiment, the configuration module may configure the size and/or the starting point of a repetition period in the following manner: the configuration module configures the size and/or the starting point of the pre-scheduling period via the semi-static configuration signaling and takes the configured size and/or starting point of the pre-scheduling period as a scheduling transmission baseline, and the configuration module reconfigures the size and/or the starting point of the pre-scheduling period taken as the scheduling transmission baseline via the dynamic configuration signaling. In this embodiment, the transmitting node may configure the size and/or the starting point of the pre-scheduling period through the semi-static configuration information and takes the configured size and/or starting point of the pre-scheduling period as a scheduling transmission criterion for data transmission, and the transmitting node is allowed to reconfigure the size and/or the starting point of the pre-scheduling period through the dynamic configuration information as the scheduling transmission criterion for data transmission.

In an optional embodiment, the apparatus further includes an assuming module. The assuming module is configured to the size and/or the starting point of the pre-scheduling period with the receiving node.

In an optional embodiment, after the assuming module assumes the size and/or the starting point of the pre-scheduling period with the receiving node, the apparatus further includes a first processing module and a second processing module, which are described below.

The first processing module is connected to the assuming module and is configured to take the size and/or the starting point of the pre-scheduling period assumed with the receiving node as the scheduling transmission baseline. The second processing module is connected to the first processing module and is configured to reconfigure the size and/or the starting point of the pre-scheduling period taken as the scheduling transmission baseline through the dynamic configuration signaling. In this embodiment, the transmitting node may take the size and/or the starting point of the pre-scheduling period assumed with the receiving node as the scheduling transmission criterion for data transmission, and the transmitting node is allowed to reconfigure the size and/or the starting point of the pre-scheduling period through the dynamic configuration information as the scheduling transmission criterion for data transmission.

In an optional embodiment, the size of the pre-scheduling period is an absolute time amount or a relative time amount. When the size of the pre-scheduling period is the absolute time amount, the pre-scheduling period is an absolute duration. When the size of the pre-scheduling period is the relative time amount, the size of the pre-scheduling period is determined according to at least one of the following determined information: a number of orthogonal frequency division multiplexing (OFDM) symbols, a number of scheduling units, a number of subframes, a number of timeslots and a number of scheduling triggering timings.

In an optional embodiment, when the size of the pre-scheduling period is determined according to at least one of the determined information, at least one pre-scheduling period includes at least one of: the OFDM symbols of different durations, the scheduling units of different durations, the subframes of different durations and timeslots of different durations; and/or only one pre-scheduling period includes at least one of: the OFDM symbols of the same duration, the scheduling units of the same duration, the subframes of the same duration and timeslots of the same duration.

In an optional embodiment, a level of the size and/or the starting point of the pre-scheduling period includes at least one of: a cell level, a beam level, a level of a transmitting node (such as a level of a user equipment (UE)), a carrier level, a service type level, a level of a group of transmitting nodes (such as a level of a group of UEs), a beam group level, a cell group level, a carrier group level and a level of a group of service types. In this embodiment, the level of the receiving node refers to that each receiving node corresponds to one size and/or one starting point of the pre-scheduling period and has corresponding configuration information of the pre-scheduling period and scheduling triggering timings.

In an optional embodiment, when the configuration information of the pre-scheduling period is at the level of the receiving node, the size and/or the starting point of the pre-scheduling period configured through the configuration information is directed to the receiving node and the pre-scheduling period includes at least one scheduling triggering timing; the transmitting node transmits the scheduling triggering information at the at least one scheduling triggering timing and the receiving node transmits data after the receiving node detects the scheduling triggering information. Alternatively, when the configuration information of the pre-scheduling period is at the level of the receiving node, the size and/or the starting point of the pre-scheduling period configured through the configuration information is directed to the receiving node and the pre-scheduling period includes the at least one scheduling triggering timing; the receiving node directly transmits the data at the at least one scheduling triggering timing. The configuration in this case includes resource allocation information and/or modulation and coding information.

In an optional embodiment, the configuration information of the pre-scheduling period includes at least one of: the size and/or the starting point of the pre-scheduling period and coding-related information within the pre-scheduling period during data transmission. The coding-related information includes at least one of: at least one piece of modulation and coding information, at least one beamforming parameter, at least one piece of transport block size information, a parameter for instructing to transmit, in the current pre-scheduling period, the configuration information of the pre-scheduling period of a next pre-scheduling period and resource allocation information.

In an optional embodiment, when the coding-related information includes the transport block size information of a plurality of transport block sizes, the receiving node needs to separately prepare the data to be transmitted according to the plurality of transport block sizes, which includes separately performing an inter-layer packaging process. When the coding-related information includes a plurality of pieces of transport block size information with respective corresponding modulation and coding information, the receiving node needs to separately prepare the data to be transmitted according to the plurality of pieces of transport block size information with the respective corresponding modulation and coding information, which includes separately performing the inter-layer packaging process and a modulation and coding process. When the coding-related information includes the plurality of pieces of transport block size information and a plurality of pieces of modulation and coding information, the receiving node needs to separately prepare the data to be transmitted according to a combination of the plurality of pieces of transport block size information and the plurality of pieces of modulation and coding information, which includes separately performing the inter-layer packaging process, the modulation and coding process and a beamforming process. When the coding-related information includes the plurality of pieces of transport block size information, the plurality of pieces of modulation and coding information and a plurality of beamforming parameters, the receiving node needs to separately prepare the data to be transmitted according to a combination of values of the plurality of pieces of transport block size information, the plurality of pieces of modulation and coding information and the plurality of beamforming parameters, which includes separately performing the inter-layer packaging process, the modulation and coding process and the beamforming process.

In an optional embodiment, the scheduling triggering information includes at least one of: the resource allocation information, transmitting triggering information, a specific time or scheduling unit for transmitting the data to be transmitted, an identifier of the receiving node and indication information for indicating the data to be transmitted. The indication information for indicating the data to be transmitted is used for notifying the receiving node to select current data to be transmitted from more than two pieces of data to be transmitted prepared according to the configuration information of the pre-scheduling period. The transmitting triggering information is used for notifying the receiving node to transmit the prepared data to be transmitted at a specific transmitting time which is a pre-assumed scheduling unit after the transmitting triggering information has been received.

Figure 7:
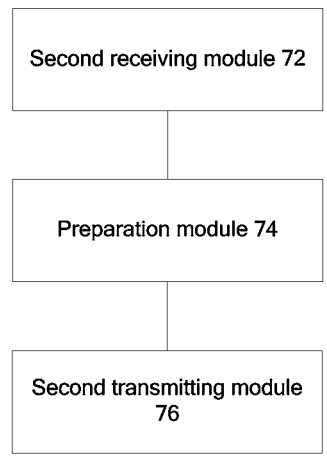
FIG. 7 is block diagram 2 illustrating a structure of of a data transmission apparatus according to an embodiment of the present disclosure.

FIG. 7 is a block diagram 2 illustrating a data transmission apparatus according to an embodiment of the present disclosure. The apparatus may be applied to a receiving node. As shown in FIG. 7, the apparatus includes a second receiving module 72, a preparation module 74 and a second transmitting module 76. The apparatus is described below.

The second receiving module 72 is configured to receive configuration information of a pre-scheduling period from a transmitting node. The preparation module 74 is connected to the second receiving module 72 and is configured to prepare data to be transmitted according to the configuration information of the pre-scheduling period. The second transmitting module 76 is connected to the preparation module 74 and is configured to transmit the data to be transmitted.

In an optional embodiment, the second transmitting module 76 further includes a first receiving unit or a second transmitting unit. The second transmitting module 76 is described below.

The first receiving unit is configured to receive scheduling triggering information from the transmitting node and transmit the data to be transmitted according to the scheduling triggering information. The second transmitting unit is configured to transmit the data to be transmitted in a manner assumed with the receiving node at a scheduling triggering timing. The pre-scheduling period includes at least one scheduling triggering timing. Optionally, the second transmitting module 76 may be further configured to transmit the data to be transmitted at the scheduling triggering timing of the pre-scheduling period according to the configuration information of the pre-scheduling period.

In an optional embodiment, the first receiving unit may receive the scheduling triggering information from the transmitting node in the following manner: the first receiving unit determines the scheduling triggering timing; and the first receiving unit receives the scheduling triggering information at the scheduling triggering timing.

In an optional embodiment, the first receiving unit may determine the scheduling triggering timing in at least one of the following manners: the first receiving unit determines a scheduling triggering timing configured by the transmitting node, determines a scheduling triggering timing assumed by the transmitting node with the receiving node, determines a scheduling triggering timing dynamically acquired according to service transmission requirements, determines a scheduling triggering timing configured through the configuration information of the pre-scheduling period, and determines the scheduling triggering timing according to a size and/or a starting point of the pre-scheduling period. In this embodiment, the scheduling triggering timing is determined according to the size and/or the starting point of the pre-scheduling period when the pre-scheduling period includes one scheduling triggering timing.

In an optional embodiment, the second transmitting module 76 includes a third transmitting unit. The third transmitting unit is configured to transmit the data to be transmitted in a manner assumed with the transmitting node at a predetermined time after the scheduling triggering information has been received.

In an optional embodiment, the second receiving module 72 may receive the configuration information of the pre-scheduling period from the transmitting node in one of the following manners:

The second receiving module 72 determines a pre-scheduling period timing pre-configured by the transmitting node or assumed with the transmitting node and receives the configuration information of the pre-scheduling period from the transmitting node at the pre-scheduling period timing. The second receiving module 72 determines the scheduling triggering timing of receiving the configuration information of the pre-scheduling period and receives the configuration information of the pre-scheduling period from the transmitting node at the scheduling triggering timing. The second receiving module 72 determines a transmitting position pre-configured by the transmitting node or assumed with the transmitting node and receives the configuration information of the pre-scheduling period from the transmitting node at the transmitting position.

In an optional embodiment, a position of the pre-scheduling period timing for transmitting the configuration information of a current pre-scheduling period includes one of: a starting point of the current pre-scheduling period, an ending point of a previous pre-scheduling period, an assumed point in the previous pre-scheduling period, a point configured via predetermined signaling in the previous pre-scheduling period and a scheduling triggering timing configured or assumed via the predetermined signaling in the previous pre-scheduling period.

In an optional embodiment, a level of the predetermined signaling includes at least one of: a cell level, a beam level, a level of a transmitting node (such as a level of a user equipment (UE)), a carrier level, a service type level, a level of a group of transmitting nodes (such as a level of a group of UEs), a beam group level, a cell group level, a carrier group level and a level of a group of service types.

In an optional embodiment, the second receiving module 72 further includes a second receiving unit or a second determination unit. The second receiving module 72 is described below.

The second receiving unit is configured to receive the configuration signaling from the transmitting node. The second determination unit is configured to determine the configuration information of the pre-scheduling period according to the configuration signaling.

In an optional embodiment, the second receiving unit may receive the configuration signaling from the transmitting node in at least one of the following manners: the second receiving unit receives the configuration signaling transmitted from the transmitting node through a higher-layer system broadcast message; the second receiving unit receives the configuration signaling transmitted from the transmitting node through a dedicated radio resource control (RRC) message of the receiving node; the second receiving unit receives the configuration signaling transmitted from the transmitting node through a dedicated downlink or uplink physical control channel of the receiving node; and the second receiving unit receives the configuration signaling transmitted from the transmitting node through a common downlink or uplink physical control channel.

In an optional embodiment, the second receiving unit may be configured to perform at least one of the following operations: the second receiving unit receives the configuration information transmitted from the transmitting node through the higher-layer system broadcast message; the second receiving unit receives the configuration information transmitted from the transmitting node through the dedicated radio resource control (RRC) message of the receiving node; the second receiving unit receives the configuration information transmitted from the transmitting node through the dedicated downlink or uplink physical control channel of the receiving node; and the second receiving unit receives the configuration information transmitted from the transmitting node through the common downlink or uplink physical control channel.

In an optional embodiment, the configuration information of the pre-scheduling period includes at least one of: the size and/or the starting point of the pre-scheduling period and coding-related information within the pre-scheduling period during data transmission. The coding-related information includes at least one of: at least one piece of modulation and coding information, at least one beamforming parameter, at least one piece of transport block size information, a parameter for instructing to transmit, in the current pre-scheduling period, the configuration information of the pre-scheduling period of a next pre-scheduling period and resource allocation information.

In an optional embodiment, the preparation module 74 is further configured to perform one of the following operations: when the coding-related information includes the transport block size information of a plurality of transport block sizes, the preparation module 74 needs to separately prepare the data to be transmitted according to the plurality of transport block sizes, which includes separately performing an inter-layer packaging process; when the coding-related information includes a plurality of pieces of transport block size information with respective corresponding modulation and coding information, the preparation module 74 needs to separately prepare the data to be transmitted according to the plurality of pieces of transport block size information with the respective corresponding modulation and coding information, which includes separately performing the inter-layer packaging process and a modulation and coding process; when the coding-related information includes the plurality of pieces of transport block size information and a plurality of pieces of modulation and coding information, the preparation module 74 needs to separately prepare the data to be transmitted according to a combination of the plurality of pieces of transport block size information and the plurality of pieces of modulation and coding information, which includes separately performing the inter-layer packaging process, the modulation and coding process and a beamforming process; when the coding-related information includes the plurality of pieces of transport block size information, the plurality of pieces of modulation and coding information and a plurality of beamforming parameters, the preparation module 74 needs to separately prepare the data to be transmitted according to a combination of values of the plurality of pieces of transport block size information, the plurality of pieces of modulation and coding information and the plurality of beamforming parameters, which includes separately performing the inter-layer packaging process, the modulation and coding process and the beamforming process.

In an optional embodiment, the size and/or the starting point of the pre-scheduling period is configured via dynamic configuration signaling and/or semi-static configuration signaling.

In an optional embodiment, the apparatus further includes a first determination module or a second determination module, which are described below.

The first determination module is configured to determine the size and/or the starting point of the pre-scheduling period via the semi-static configuration signaling and take the configured size and/or starting point of the pre-scheduling period as a scheduling transmission baseline. The second determination module is configured to determine a change of the size and/or the starting point of the pre-scheduling period taken as the scheduling transmission baseline via the dynamic configuration signaling.

In an optional embodiment, the size and/or the starting point of the pre-scheduling period is configured via the dynamic configuration signaling and/or the semi-static configuration signaling in one of the manners described below. The receiving node receives and determines the size of the pre-scheduling period via the semi-static configuration signaling and the receiving node receives and determines a period-related starting point of the pre-scheduling period via the dynamic configuration signaling. The receiving node receives and determines the size and the starting point of the pre-scheduling period via the semi-static configuration signaling. The receiving node determines the size and/or the starting point of the pre-scheduling period via the semi-static configuration signaling and takes the configured size and/or starting point of the pre-scheduling period as a scheduling transmission criterion for data transmission, and the receiving node is allowed to reconfigure the size and/or the starting point of the pre-scheduling period taken as the scheduling transmission criterion for data transmission through dynamic configuration information.

In an optional embodiment, the scheduling triggering information includes at least one of: the resource allocation information, transmitting triggering information, a specific time or scheduling unit for transmitting the data to be transmitted, an identifier of the receiving node and indication information for indicating the data to be transmitted. The indication information for indicating the data to be transmitted is used for notifying the receiving node to select current data to be transmitted from more than two pieces of data to be transmitted prepared according to the configuration information of the pre-scheduling period. The transmitting triggering information is used for notifying the receiving node to transmit the prepared data to be transmitted at a specific transmitting time which is a pre-assumed scheduling unit after the transmitting triggering information has been received.

In an optional embodiment, a level of the configuration information of the pre-scheduling period includes at least one of: a cell level, a beam level, a level of a receiving node, a carrier level, a service type level, a level of a group of receiving nodes, a beam group level, a cell group level, a carrier group level and a level of a group of service types. The level of the receiving node refers to that each receiving node corresponds to one size and/or one starting point of the pre-scheduling period and has corresponding configuration information of the pre-scheduling period and scheduling triggering timings.

In an optional embodiment, when the configuration information of the pre-scheduling period is at the level of the receiving node, the size and/or the starting point of the pre-scheduling period configured through the configuration information is directed to the receiving node and the pre-scheduling period includes at least one scheduling triggering timing; the transmitting node transmits the scheduling triggering information at the at least one scheduling triggering timing and the receiving node transmits data after the receiving node detects the scheduling triggering information. Alternatively, when the configuration information of the pre-scheduling period is at the level of the receiving node, the size and/or the starting point of the pre-scheduling period configured through the configuration information is directed to the receiving node and the pre-scheduling period includes the at least one scheduling triggering timing; the receiving node directly transmits the data at the at least one scheduling triggering timing. The configuration in this case includes the resource allocation information and/or the modulation and coding information.

It is to be noted that the various modules described above may be implemented by software or hardware. Implementation by hardware may, but may not necessarily, be performed in the following manners: the various modules described above are located in a same processor, or the various modules described above are located in their respective processors in any combination form.

An embodiment of the present disclosure further provides a storage medium. Optionally, in the embodiment, the storage medium may be configured to store program codes for executing the steps described above.

Optionally, in the embodiment, the storage medium may include, but is not limited to, a U disk, a read-only memory (ROM), a random access memory (RAM), a mobile hard disk, a magnetic disk, an optical disk or another medium capable of storing the program codes.

Optionally, in the embodiment, a processor executes the steps described above according to the program codes stored in the storage medium.

Optionally, for specific examples in the embodiment, reference may be made to the examples described in the above embodiments and optional implementation modes, and repetition will not be made in the embodiment.

Apparently, it should be understood by those skilled in the art that each of the above-mentioned modules or steps of the present disclosure may be implemented by a general-purpose computing device, the modules or steps may be concentrated on a single computing device or distributed on a network composed of multiple computing devices, and alternatively, the modules or steps may be implemented by program codes executable by the computing devices, so that the modules or steps may be stored in a storage device and executed by the computing devices. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure. For those skilled in the art, the present disclosure may have various modifications and variations. Any modifications, equivalent substitutions, improvements and the like made within the spirit and principle of the present disclosure should fall within the scope of the present disclosure.

INDUSTRIAL APPLICABILITY

As described above, the data transmission method and apparatus provided by the embodiments of the present disclosure have the following beneficial effects: the problem in the existing art of a large feedback time interval after data transmission is solved, a data transmission time interval is shortened and data transmission efficiency is improved.

What is claimed is:

1. A data transmission method, comprising:
transmitting, by a transmitting node, a configuration information through a dedicated radio resource control (RRC) message to a receiving node, wherein the configuration information configures a time duration and a starting point of a pre-scheduling period, resource allocation information, and a plurality of scheduled trigger occasions during the pre-scheduling period for indicating the receiving node to transmit data at the plurality of scheduled trigger occasions without the transmitting node transmitting a scheduling triggering information to indicate the receiving node to transmit the data immediately, wherein the plurality of scheduled trigger occasions includes at least one of a first type of scheduled trigger occasion or a second type of scheduled trigger occasion; and
receiving, by the transmitting node, a transmission from the receiving node according to the configuration information.

2. The method of claim 1, wherein the configuration information further comprises:
modulation and coding information.

3. The method of claim 1, wherein the configuration information further comprises:
a precoding information.

4. The method of claim 1, wherein the transmitting the configuration information is performed at a selected frequency subband within a carrier, and wherein the carrier is configured as multiple frequency subbands.

5. The method of claim 1, wherein the first type of scheduled trigger occasion includes a periodic scheduled trigger occasion, and the second type of scheduled trigger occasion includes an aperiodic scheduled trigger occasion.

6. A wireless communication apparatus, comprising:
a receiver configured to receive a configuration information through a dedicated radio resource control (RRC) message from a transmitting node, wherein the configuration information configures a time duration and a starting point of a pre-scheduling period, resource allocation information, and a plurality of scheduled trigger occasions during the pre-scheduling period, wherein the plurality of scheduled trigger occasions indicates the wireless communication apparatus to transmit data at the plurality of scheduled trigger occasions without receiving a scheduling triggering information indicating the wireless communication apparatus to transmit the data immediately, and wherein the plurality of scheduled trigger occasions includes at least one of a first type of scheduled trigger occasion or a second type of scheduled trigger occasion; and
a transmitter configured to perform a transmission according to the configuration information.

7. The wireless communication apparatus of claim 6, wherein the configuration information further comprises:
a precoding information.

8. The wireless communication apparatus of claim 6, wherein the configuration information is received at a selected frequency subband within a carrier, and wherein the carrier is configured as multiple frequency subbands.

9. The wireless communication apparatus of claim 6, wherein the first type of scheduled trigger occasion includes a periodic scheduled trigger occasion, and the second type of scheduled trigger occasion includes an aperiodic scheduled trigger occasion.

10. A wireless communication apparatus, comprising:
 a transmitter configured to transmit a configuration information through a dedicated radio resource control (RRC) message to a receiving node, wherein the configuration information configures a time duration and a starting point of a pre-scheduling period, resource allocation information, and a plurality of scheduled trigger occasions during the pre-scheduling period for indicating the receiving node to transmit data at the plurality of scheduled trigger occasions without transmitting a scheduling trigger information to indicate the receiving node to transmit the data immediately, and wherein the plurality of scheduled trigger occasions includes at least one of a first type of scheduled trigger occasion or a second type of scheduled trigger occasion; and
 a receiver configured to receive a transmission from the receiving node according to the configuration information.

11. The wireless communication apparatus of claim 10, wherein the configuration information further comprises:
 a precoding information.

12. The wireless communication apparatus of claim 10, wherein the configuration information is transmitted at a selected frequency subband within a carrier, and wherein the carrier is configured as multiple frequency subbands.

13. The wireless communication apparatus of claim 10, wherein the first type of scheduled trigger occasion includes a periodic scheduled trigger occasion, and the second type of scheduled trigger occasion includes an aperiodic scheduled trigger occasion.

* * * * *